(12) United States Patent
Funakoshi et al.

(10) Patent No.: US 10,748,094 B2
(45) Date of Patent: Aug. 18, 2020

(54) REMINDER NOTIFICATION SYSTEM AND REMINDER NOTIFICATION METHOD

(71) Applicant: HONDA MOTOR CO., LTD., Tokyo (JP)

(72) Inventors: Kotaro Funakoshi, Wako (JP); Satoru Noguchi, Wako (JP); Shigeo Nishida, Kochi (JP); Takaya Matsumoto, Kochi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 737 days.

(21) Appl. No.: 15/235,553

(22) Filed: Aug. 12, 2016

(65) Prior Publication Data

US 2017/0091696 A1    Mar. 30, 2017

(30) Foreign Application Priority Data

Sep. 29, 2015  (JP) .................................. 2015-192282

(51) Int. Cl.
*G06Q 10/00* (2012.01)
*G06Q 10/06* (2012.01)
(Continued)

(52) U.S. Cl.
CPC ...  *G06Q 10/063114* (2013.01); *G06F 3/0488* (2013.01); *G06F 3/04817* (2013.01); *G06Q 10/109* (2013.01)

(58) Field of Classification Search
None
See application file for complete search history.

(56) References Cited

U.S. PATENT DOCUMENTS

| 5,899,979 A * | 5/1999 | Miller | G06Q 10/1097 |
| | | | 705/7.21 |
| 6,272,532 B1 * | 8/2001 | Feinleib | G06Q 10/107 |
| | | | 709/206 |

(Continued)

FOREIGN PATENT DOCUMENTS

| JP | 2004-133746 | 4/2004 |
| JP | 2004-362214 | 12/2004 |

(Continued)

OTHER PUBLICATIONS

31. You Tu, Ling Chen, Mingqi Lv, Youbiao Ye, Weikai Huang, and Gencai Chen et al. (iReminder: An Intuitive Location-Based Reminder That Knows Where You Are Going, Intl. Journal of Human-Computer Interaction, 29: 838-850, 2013) (Year: 2013).*

(Continued)

*Primary Examiner* — Hafiz A Kassim
(74) *Attorney, Agent, or Firm* — Rankin, Hill & Clark LLP

(57) ABSTRACT

A reminder notification system includes a first terminal and a second terminal which include a reminder notification unit configured to provide a reminder of a predetermined task. The first terminal includes a task registration setting unit configured to register and set the predetermined task as a target task. The first terminal and the second terminal each include a task information share unit configured to share the target task that is registered and set in the task registration setting unit between the first terminal and the second terminal. At least one of the first terminal and the second terminal includes a notification terminal setting unit configured to set any of the first terminal and the second terminal as a notification terminal configured to provide the reminder on the basis of content of the target task when executable conditions of the target task are satisfied.

5 Claims, 16 Drawing Sheets

(51) Int. Cl.
    *G06Q 10/10*           (2012.01)
    *G06F 3/0481*         (2013.01)
    *G06F 3/0488*         (2013.01)

(56) References Cited

U.S. PATENT DOCUMENTS

| | | | | |
|---|---|---|---|---|
| 6,937,995 | B1* | 8/2005 | Kepecs | G06Q 20/387 |
| | | | | 705/14.27 |
| 7,016,855 | B2* | 3/2006 | Eaton | G06Q 10/10 |
| | | | | 340/988 |
| 7,221,937 | B2* | 5/2007 | Lau | G06Q 10/109 |
| | | | | 455/419 |
| 7,528,713 | B2* | 5/2009 | Singh | G01S 5/0252 |
| | | | | 340/539.11 |
| 7,541,940 | B2* | 6/2009 | Upton | G08B 1/08 |
| | | | | 340/686.1 |
| 8,219,115 | B1* | 7/2012 | Nelissen | H04W 4/021 |
| | | | | 455/456.3 |
| 8,929,871 | B2* | 1/2015 | Bradburn | H04M 3/42127 |
| | | | | 455/412.2 |
| 9,111,233 | B2* | 8/2015 | Elumalai | G06Q 10/109 |
| 9,247,377 | B2* | 1/2016 | Pai | G06Q 10/109 |
| 2003/0195811 | A1* | 10/2003 | Hayes, Jr. | G06Q 10/10 |
| | | | | 705/26.41 |
| 2003/0225589 | A1* | 12/2003 | Eaton | G06Q 30/0239 |
| | | | | 709/207 |
| 2005/0091118 | A1* | 4/2005 | Fano | G06Q 10/109 |
| | | | | 705/26.43 |
| 2005/0273493 | A1* | 12/2005 | Buford | G06Q 10/109 |
| | | | | 709/204 |
| 2006/0061488 | A1* | 3/2006 | Dunton | G06Q 10/109 |
| | | | | 340/988 |
| 2006/0106774 | A1* | 5/2006 | Cohen | G06Q 30/06 |
| 2007/0282660 | A1* | 12/2007 | Forth | G06Q 10/10 |
| | | | | 705/7.15 |
| 2008/0077489 | A1* | 3/2008 | Gilley | G06Q 30/02 |
| | | | | 705/14.11 |
| 2008/0079566 | A1* | 4/2008 | Singh | G08B 21/24 |
| | | | | 340/539.13 |
| 2008/0255919 | A1* | 10/2008 | Gorder | G06Q 10/109 |
| | | | | 705/7.13 |
| 2010/0026526 | A1* | 2/2010 | Yokota | G08G 1/096838 |
| | | | | 340/996 |
| 2011/0045841 | A1* | 2/2011 | Kuhlke | G06Q 10/10 |
| | | | | 455/456.1 |
| 2011/0071893 | A1* | 3/2011 | Malhotra | G06Q 10/109 |
| | | | | 705/14.23 |
| 2011/0314404 | A1* | 12/2011 | Kotler | G06Q 10/109 |
| | | | | 715/772 |
| 2012/0009900 | A1* | 1/2012 | Chawla | H04W 4/029 |
| | | | | 455/411 |
| 2013/0090964 | A1* | 4/2013 | Rivere | G06Q 10/00 |
| | | | | 705/7.13 |
| 2013/0217332 | A1* | 8/2013 | Altman | H04W 12/04 |
| | | | | 455/41.2 |
| 2013/0307681 | A1* | 11/2013 | Borg | G06Q 10/109 |
| | | | | 340/517 |
| 2014/0096234 | A1* | 4/2014 | Zafiroglu | G06F 21/6218 |
| | | | | 726/17 |
| 2014/0107920 | A1* | 4/2014 | Jayanthi | G01C 21/26 |
| | | | | 701/467 |
| 2014/0122150 | A1* | 5/2014 | Davis | G06Q 10/063118 |
| | | | | 705/7.17 |
| 2014/0194095 | A1* | 7/2014 | Wynne | H04M 1/72552 |
| | | | | 455/411 |
| 2014/0304019 | A1* | 10/2014 | Scott | G06Q 10/063114 |
| | | | | 705/7.15 |
| 2014/0337077 | A1* | 11/2014 | Zsebedics | G06Q 10/063114 |
| | | | | 705/7.15 |
| 2014/0372525 | A1 | 12/2014 | Raghavan et al. | |
| 2015/0005009 | A1* | 1/2015 | Tomkins | H04L 67/22 |
| | | | | 455/456.3 |
| 2015/0012582 | A1* | 1/2015 | Masano | H04W 4/023 |
| | | | | 709/202 |
| 2015/0015409 | A1* | 1/2015 | Won | G06Q 10/109 |
| | | | | 340/815.4 |
| 2015/0033138 | A1* | 1/2015 | Manchanda | G06Q 10/06 |
| | | | | 715/739 |
| 2015/0172858 | A1* | 6/2015 | Choi | H04W 12/02 |
| | | | | 455/456.1 |
| 2015/0207865 | A1* | 7/2015 | Hsieh | G06Q 10/109 |
| | | | | 715/716 |
| 2017/0004396 | A1* | 1/2017 | Ghotbi | G06N 3/006 |

FOREIGN PATENT DOCUMENTS

| | | |
|---|---|---|
| JP | 2006-023793 | 1/2006 |
| JP | 2007-207013 | 8/2007 |
| JP | 2007-208479 | 8/2007 |
| JP | 2008-227717 | 9/2008 |
| JP | 2009-100010 | 5/2009 |
| JP | 2010-191812 | 9/2010 |
| KR | 10-2015-0014296 | 2/2015 |

OTHER PUBLICATIONS

Japanese Notice of Allowance dated Oct. 30, 2018 with English Translation, 6 pages.

* cited by examiner

FIG. 4

| PATTERN | TASK TRIGGER PERFORMER | TASK PERFORMER | COMPLETION NOTIFICATION | USE CASE |
|---|---|---|---|---|
| A | SHARE USER | REGISTERED USER | — | OFFER OF MEET SHARE USER BY REGISTERED USER |
| B | REGISTERED USER | SHARE USER | REGISTERED USER | REQUEST OF MEET REGISTERED USER BY SHARE USER |
| C | SHARE USER | SHARE USER | REGISTERED USER | REQUEST OF ERRANDS BY SHARE USER |

FIG. 5

CANDIDATE SITE INFORMATION DB

| CANDIDATE SITE | ADDRESS OF CANDIDATE SITE |
|---|---|
| CONVENIENCE STORE A | ・・・ SHINAGAWA-KU, TOKYO |
| CONVENIENCE STORE B | ・・・ MEGURO-KU, TOKYO |
| CONVENIENCE STORE C | ・・・ MEGURO-KU, TOKYO |
| CONVENIENCE STORE D | ・・・ CHIYODA-KU, TOKYO |
| SUPERMARKET A | ・・・ SETAGAYA-KU, TOKYO |
| SUPERMARKET B | ・・・ SUGINAMI-KU, TOKYO |
| DRUGSTORE A | ・・・ OTA-KU, TOKYO |
| A STATION | ・・・ MEGURO-KU, TOKYO |
| B STATION | ・・・ CHIYODA-KU, TOKYO |
| MOVIE THEATER A | ・・・ CHUO-KU, TOKYO |

| COOPERATION LEVEL | DEFINITION | POSITION INFORMATION AUTOMATIC TRANSMISSION | POSITION INFORMATION REQUEST DISPLAY |
|---|---|---|---|
| 1 | CONSTANTLY NOTIFY OF POSITION INFORMATION | ON | OFF |
| 2 | BASED ON A REQUEST | OFF | ON |
| 3 | ACTIVELY (IGNORE REQUEST) | OFF | OFF |

REMINDER NOTIFICATION SYSTEM AND REMINDER NOTIFICATION METHOD

CROSS-REFERENCE TO RELATED APPLICATION

Priority is claimed on Japanese Patent Application No. 2015-192282, filed Sep. 29, 2015, the content of which is incorporated herein by reference.

BACKGROUND OF THE INVENTION

Field of the Invention

The present invention relates to a reminder notification system and a reminder notification method.

Description of Related Art

There is a mobile terminal that provides a user with a reminder when the user arrives at a target position (for example, refer to Japanese Unexamined Patent Application, First Publication No. 2006-23793 (hereinafter referred to as Patent Literature 1)). The mobile terminal includes a device configured to acquire position information, for example, a Global Positioning System (GPS), and can acquire an own position of a user who possesses the mobile terminal by the GPS. In addition, the mobile terminal acquires the own position of the user by the GPS and provides a reminder when the own position arrives at the target position. The reminder means to notify the user of information of a task by a transmission technique using, for example, an image, a voice, and a vibration. In addition, there is a technology in which a user of a portable terminal sets a target position for a user (hereinafter referred to as "another user") of another portable terminal, and when the other user arrives at the target position, the user is notified of a reminder.

SUMMARY OF THE INVENTION

However, in the above technology, in a case in which arrival at the target position is set as a predetermined task, if the reminder is provided when the own position of the user arrives at the target position, arrival at the target position is detected by the portable terminal of the user. Similarly, in a case where the user of the portable terminal sets the target position for another user and the user is notified of a reminder when the other user arrives at the target position, the other user detects the own position by another portable terminal, and detects arrival at the target position. Therefore, there are problems in that own processing is performed between the user's terminal and the other user's terminal and it is difficult to smoothly perform a process until the reminder is provided when a task is performed.

In view of the above-described problems, aspects according to the present invention provide a reminder notification system and a reminder notification method through which, when a task set between a user and another user is performed, it is possible to smoothly perform a process until a reminder is provided.

In order to achieve the above objects, the present invention employs the following aspects.

(1) A reminder notification system according to an aspect of the present invention is a reminder notification system that includes a first terminal and a second terminal which include a reminder notification unit configured to provide a reminder of a predetermined task. The first terminal includes a task registration setting unit configured to register and set the predetermined task as a target task. The first terminal and the second terminal each include a task information share unit configured to share the target task that is registered and set in the task registration setting unit between the first terminal and the second terminal. At least one of the first terminal and the second terminal includes a notification terminal setting unit configured to set any of the first terminal and the second terminal as a notification terminal configured to provide the reminder on the basis of content of the target task. The reminder notification unit included in the notification terminal notifies of the reminder when executable conditions of the target task are satisfied.

(2) In the aspect of the above (1), the second terminal may include an acceptance detection unit configured to detect acceptance of the target task; and an acceptance notification unit configured to notify the first terminal of the acceptance of the target task when the acceptance of the target task is detected by the acceptance detection unit.

(3) In the aspect of the above (1) or (2), the second terminal may include a completion detection unit configured to detect execution completion of the target task; and a completion notification unit configured to notify the first terminal of execution completion of the target task when execution completion of the target task is detected by the completion detection unit if the second terminal is the notification terminal.

(4) In any aspect of the above (1) to (3), the second terminal may include a reminder notification information notification unit configured to notify the first terminal of reminder notification information when the second terminal is notified of the reminder if the second terminal is the notification terminal.

(5) In any aspect of the above (1) to (4), the notification terminal may further include a position acquisition unit configured to detect a predetermined position, and the executable conditions may be determined on the basis of the predetermined position acquired in the position acquisition unit.

(6) In the aspect of the above (5), the executable conditions may include acquisition of arrival of a performer who performs the target task at a position in which the target task is executed at the execution position of the target task by the position acquisition unit.

(7) In any aspect of the above (1) to (6), the first terminal and the second terminal each may include a share level setting unit configured to set a share level of information between the terminals.

(8) In any aspect of the above (1) to (7), a plurality of the second terminals may be provided, and each of the second terminals may include: an individual acceptance detection unit configured to detect acceptance of the corresponding target task; and an individual acceptance notification unit configured to notify the other second terminals of acceptance of the target task when acceptance of the target task is detected by the individual acceptance detection unit.

(9) In the aspect of the above (1) or (2), a plurality of the second terminals may be provided, and each of the second terminals may include: an individual completion detection unit configured to detect execution completion of the target task if the notification terminal is the second terminal; and an individual completion notification unit configured to notify the other second terminals of execution completion of the target task when execution completion of the target task is detected by the individual completion detection unit.

(10) A reminder notification method according to an aspect of the present invention that is a method for a reminder notification in which a reminder notification procedure of providing a reminder of a predetermined task is performed in a first terminal and a second terminal, the reminder notification method including: a task registration setting procedure in which the first terminal registers and sets the predetermined task as a target task; a task information share procedure in which the first terminal and the second terminal share the target task that is registered and set in the task registration setting procedure between the first terminal and the second terminal; a notification terminal setting procedure in which at least one of the first terminal and the second terminal sets any of the first terminal and the second terminal as a notification terminal configured to provide the reminder on the basis of content of the target task; and a procedure in which the notification terminal provides the reminder when executable conditions of the target task are satisfied.

According to the above-described aspects of (1) and (10), a task is shared between the first terminal and the second terminal, and when executable conditions of the target task are satisfied, the notification terminal provides the reminder.

Therefore, since task information about the target task can be shared, a process of executing the task can be cooperatively performed between a user who possesses the first terminal and a user who possesses the second terminal. Accordingly, when the task set between the user and another user is performed, it is possible to smoothly perform the process until the reminder is provided.

In the above-described (2), when a user who has registered a task (hereinafter referred to as a "registered user") and a user who executes the task (hereinafter referred to as an "execution user") are different, it is possible to reliably transmit the fact that the task execution user has accepted the task to the registered user.

In the above-described (3), when the registered user and the execution user are different, it is possible to quickly transmit completion of the task to the registered user.

In the above-described (4), it is possible to quickly convey the fact that the task has been transmitted to the execution user to the task registrant.

In the above-described (5), when the task is performed at the predetermined position, it is possible to easily set executable conditions.

In the above-described (6), it is possible to convey the fact that the task performer is in a state in which he or she can execute the task to the task registrant. In the above-described (7), the share level can be set according to a relation such as a familiarity between the task registrant and the task performer.

In the above-described (8) and (9), it is possible to confirm that the task was performed between the task registrant and the task performer. When the task is registered for a plurality of task performers, if one task performer achieves execution of the task, it is possible to prevent a useless task process by the other task performers.

BRIEF DESCRIPTION OF THE DRAWINGS

FIG. 4 is a diagram showing an example of a collaboration processing pattern correspondence table.

FIG. 5 is a diagram showing an example of candidate site information data.

DETAILED DESCRIPTION OF THE INVENTION

First, an overview of an embodiment of the present invention will be described.

A reminder notification system of the present embodiment includes, for example, a plurality of portable terminals such as a smart phone or a tablet that is possessed by a user. Task information is input from one of the plurality of portable terminals, and a notification of a reminder is set. The plurality of terminals share information about a target task. Therefore, when the target task is executable or the target task is performed, a reminder is provided by a portable terminal in which the target task is registered or a portable terminal that performs a task to another portable terminal. The task information is information about the target task. The target task includes a task related to a request and a task related to an offer. The task related to a request is a task in which a registered user and an execution user are different. In addition, the task related to an offer is a task in which a registered user and an execution user are the same. The registered user is a user who has registered the target task. In addition, the execution user is a user who performs the target task.

Hereinafter, embodiments of the present invention will be described with reference to the drawings.

First Embodiment

Figure 1:
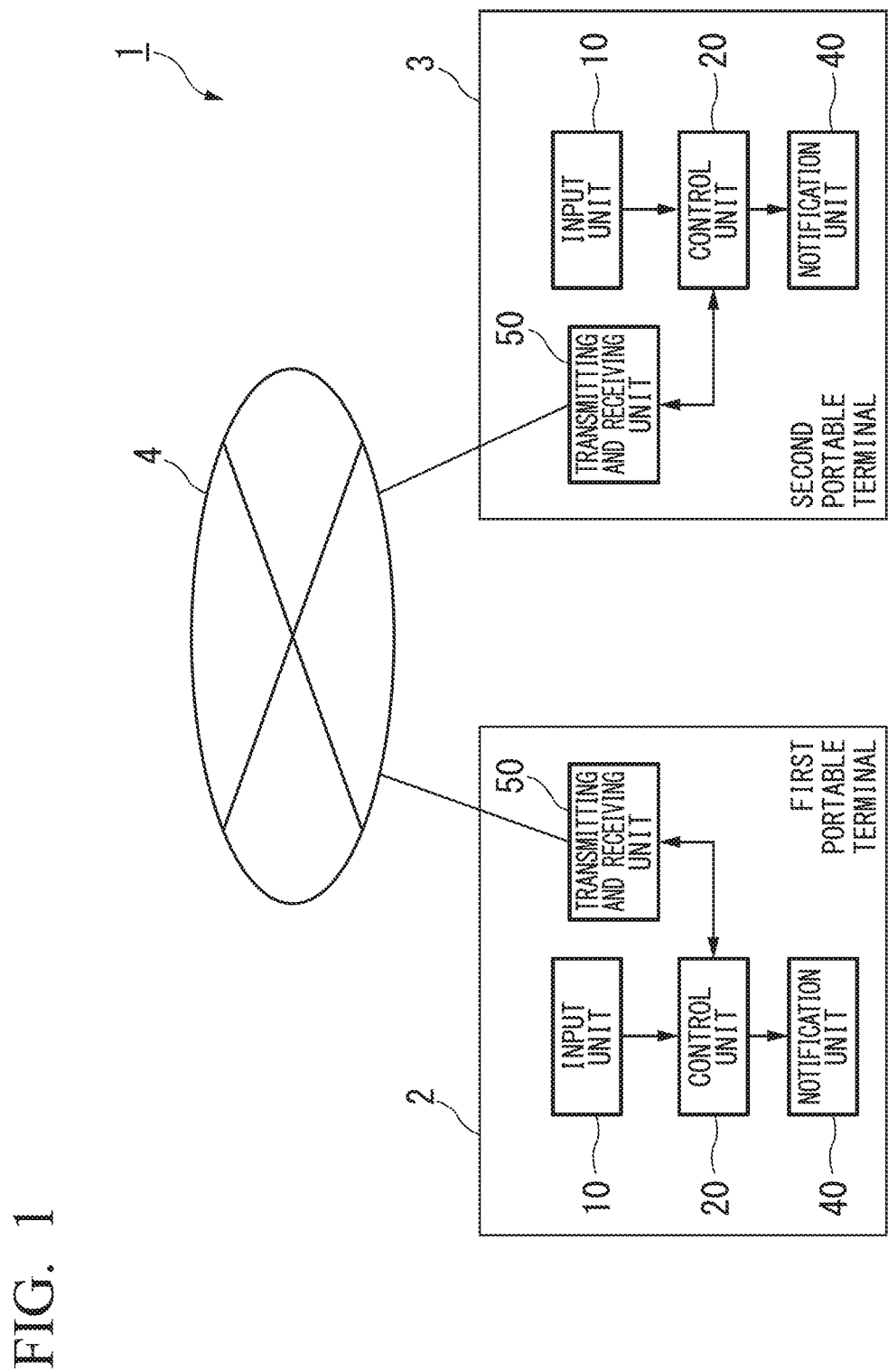
FIG. 1 is a block diagram showing a configuration of a reminder notification system according to a first embodiment.
Figure 2:
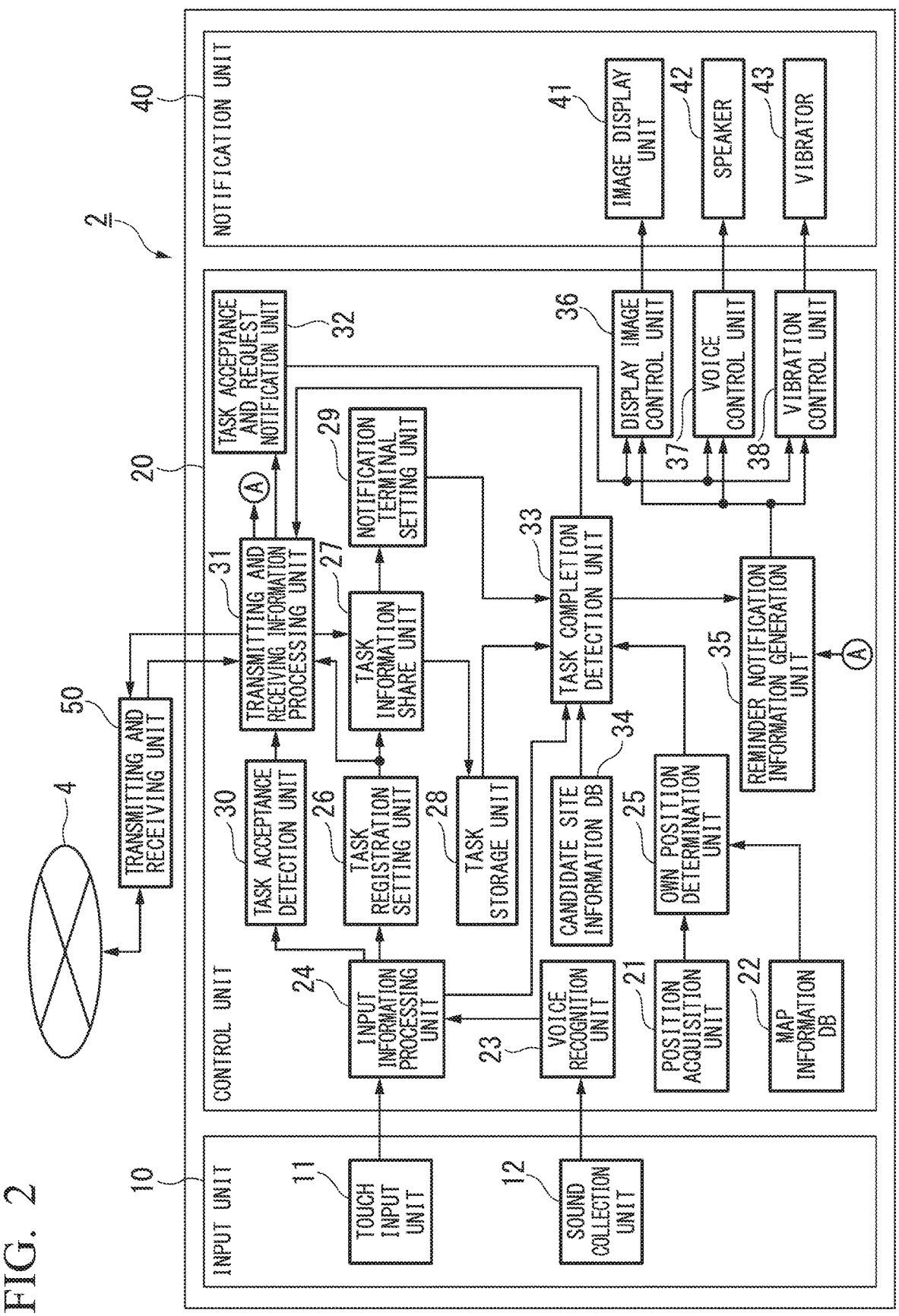
FIG. 2 is a block diagram showing a configuration of a first portable terminal.

FIG. 1 is a block diagram showing a configuration of a reminder notification system according to an embodiment, which is a first embodiment of the present invention. FIG. 2 is a block diagram showing a configuration of a first portable terminal 2. As shown in FIG. 1, a reminder notification system 1 includes the first portable terminal 2 and a second portable terminal 3. The first portable terminal 2 and the second portable terminal 3 are communicatively connected to each other via a network 4.

A registered user possesses the first portable terminal 2. A user other than the registered user possesses the second portable terminal 3. For convenience of the following description, the first portable terminal 2 possessed by the registered user is referred to as a registration terminal, and the second portable terminal 3 possessed by a user other than the registered user is referred to as a share terminal. The portable terminals 2 and 3 include an input unit 10, a control unit 20, a notification unit 40, and a transmitting and receiving unit 50. Both the portable terminals 2 and 3 have the same configuration, and the configuration of the first portable terminal 2 will be described below.

As shown in FIG. 2, the input unit 10 in the first portable terminal 2 includes a touch input unit 11 and a sound collection unit 12. The control unit 20 includes a position acquisition unit 21, a map information DB 22, a voice recognition unit 23, an input information processing unit 24, an own position determination unit 25, a task registration setting unit 26, a task information share unit 27, a task storage unit 28, a notification terminal setting unit 29, a task acceptance detection unit 30, a transmitting and receiving information processing unit 31, a task acceptance and request notification unit 32, a task completion detection unit 33, a candidate site information DB 34, a reminder notification information generation unit 35, a display image control unit 36, a voice control unit 37, and a vibration control unit 38. The notification unit 40 includes an image display unit 41, a speaker 42, and a vibrator 43.

The touch input unit 11 is a touch panel sensor provided on the image display unit 41 of the first portable terminal 2. A screen of the first portable terminal 2 includes a liquid crystal display panel and a touch panel that are integrally formed. The liquid crystal display panel of the first portable terminal 2 corresponds to the image display unit 41 of the notification unit 40, and the touch panel corresponds to the touch input unit 11. The touch input unit 11 performs detection on a screen on which an icon corresponding to a predetermined object is displayed and a touch input by a user on the screen. The touch input unit 11 detects input information that is input, by a user, by touching an icon displayed on the screen. The touch input unit 11 outputs the detected input information to the input information processing unit 24.

Figure 3A:
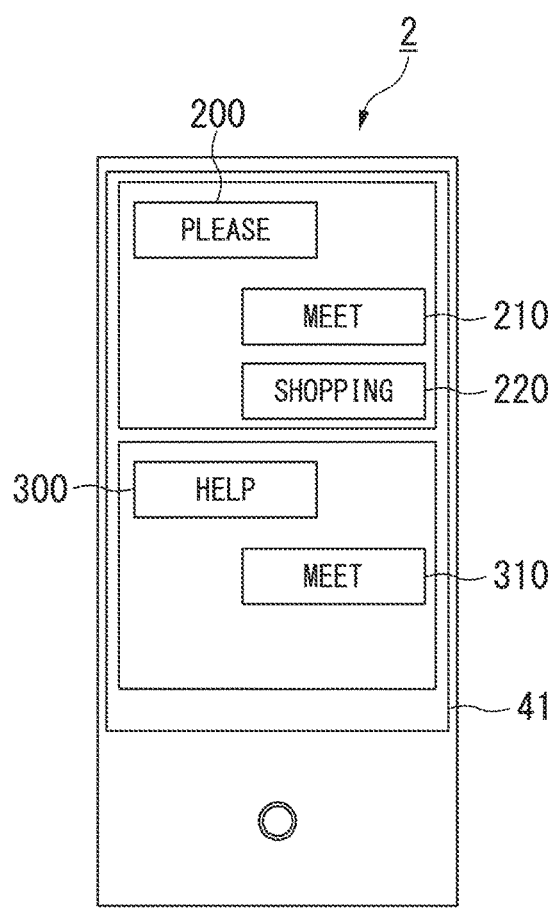
FIG. 3A is a diagram showing an example of a display state of a registration terminal and FIG. 3B is a diagram showing an example of a display state of a share terminal 3.
Figure 3B:
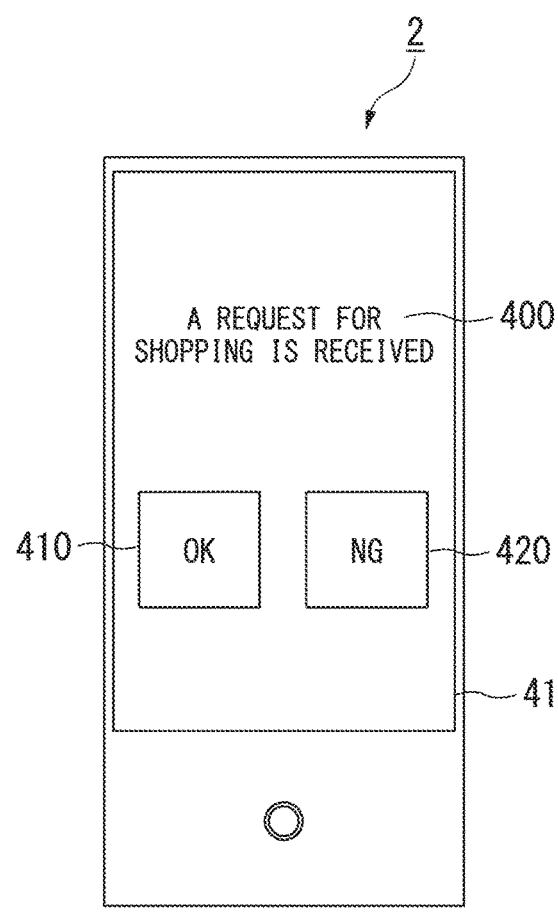

An icon corresponding to a target task serving as an execution target is displayed on the image display unit 41. FIG. 3A is a diagram showing an example of a display state of a registration terminal. FIG. 3B is a diagram showing an example of a display state of the share terminal 3. For example, as shown in FIG. 3A, a please icon 200 and a help icon 300 are displayed on the image display unit 41 in the first portable terminal 2.

The please icon 200 is an icon for requesting a target task from another user when the target task related to a request is input. A meet icon 210 and a shopping icon 220 are displayed below the please icon 200. The meet icon 210 is an icon for a user to request another user to meet him or her, for example, at the nearest station.

The shopping icon 220 is an icon for requesting another user who is out and about, for example, to shop. When the user touches the shopping icon 220, as shown in FIG. 3B, a message 400 of "a request for shopping is received" is displayed on the image display unit 41 of the second portable terminal 3 of the other user. An OK icon 410 and an NG icon 420 are displayed below the message 400. When the other user touches the OK icon 410, the request from the user is accepted. On the other hand, when the other user touches the NG icon 420, the request from the user is rejected.

The help icon 300 is an icon for offering a target task to another user when the target task related to an offer is input. A meet icon 310 is displayed below the help icon 300. The meet icon 310 is an icon for offering, for example, to meet the other user who is out and about at the nearest station. By touching this icon, notification of the reminder is set. A timing at which the reminder is provided is variously determined by patterns. The timing at which the reminder is provided will be described when the following collaboration process is described.

The sound collection unit 12 includes a microphone provided in the first portable terminal 2.

The sound collection unit 12 records a voice signal produced by a user or the like. The sound collection unit 12 converts the acquired voice signal from an analog signal into a digital signal, and outputs the converted voice signal to the voice recognition unit 23 in the control unit 20. The voice signal includes, for example, information for setting a target task and information indicating the fact that the target task has been performed.

The sound collection unit 12 records, for example, a voice signal of "Buy vegetables" produced by the user. Therefore, the user performs input more easily by an input by the sound collection unit 12 than an input by manipulating an icon displayed on the touch input unit 11.

The position acquisition unit 21 in the control unit 20 is a Global Positioning System (GPS), and acquires position information of a current location of the first portable terminal 2. The position acquisition unit 21 outputs the acquired position information of the current location to the own position determination unit 25. In addition, the position acquisition unit 21 may acquire the position information of the current location from a base station of the portable terminal or the like.

The map information DB 22 stores a range of activity of a user, for example, Japan map information. When the own position determination unit 25 reads map information, the map information DB 22 outputs the stored map information to the own position determination unit 25. The map information includes information such as a map, an address, a facility, a latitude and a longitude of a facility, and a phone number.

The voice recognition unit 23 recognizes the voice signal collected by the sound collection unit 12, and generates input information based on the user's voice. For example, when the voice signal based on the utterance of "Buy vegetables" is recognized, input information corresponding to "a request for buying vegetables" is generated as input information. In addition, for example, when voice information based on the utterance of "I will meet you at the station" is recognized, input information corresponding to "offer to meet" is generated as input information. In addition, when the voice signal based on the utterance of "I bought vegetables" is recognized, input information corresponding to "buy vegetables" is generated as input information. The voice recognition unit 23 outputs the generated input information to the input information processing unit 24.

The input information processing unit 24 generates input task information, task acceptance status information, and input task completion information on the basis of the input information output from the touch input unit 11 or the input information output from the voice recognition unit 23. The input task information is information about the input task.

The input task information includes the input task information about a request and the input task information about an offer. The task acceptance status information is information about whether another user who has been requested to perform a target task or another user who has been offered a target task accepts the target task. The input task completion information is information about task completion. The input information processing unit 24 outputs the generated input task information to the task registration setting unit 26. The input information processing unit 24 outputs the generated task acceptance status information to the task acceptance detection unit 30. The input information processing unit 24 outputs the generated input task completion information to the task completion detection unit 33.

The own position determination unit 25 reads map information of the surroundings of the current position from the map information DB 22 on the basis of the position information of the current location output from the position acquisition unit 21. The own position determination unit 25 determines an own position of a user on the basis of the position information of the current location and the map information read from the map information DB 22 and generates own position information. The own position determination unit 25 outputs the generated own position information to the task completion detection unit 33.

The task registration setting unit 26 generates task information on the basis of the input task information output from the input information processing unit 24. When the input task information is the input task information related to a request, the generated task information is task information related to a request and when the input task is the input task related to an offer, the generated task information is task information related to an offer. In the input task information, the task registration setting unit 26 decides a collaboration processing pattern with reference to a collaboration processing pattern correspondence table, which is stored therein, shown in FIG. 4. For example, when the input task information is an offer by the registered user to meet a share user, the task registration setting unit 26 selects a collaboration processing pattern A. When the input task information is a request by the share user for meeting the registered user, the task registration setting unit 26 selects a collaboration processing pattern B. When the input task information is a request by the share user for errands (shopping), the task registration setting unit 26 selects a collaboration processing pattern C. As the collaboration processing pattern, a pattern other than the above pattern A to pattern C may be provided. The task registration setting unit 26 outputs the generated task information to the task information share unit 27 and the transmitting and receiving information processing unit 31. The task registration setting unit 26 decides whether an execution user (a task performer) of the target task according to the task information is the registered user. When the execution user is not the registered user (when the execution user is the share user), task request information is output to the transmitting and receiving information processing unit 31.

The pattern A to the pattern C shown in FIG. 4 will be described below.

The task information share unit 27 receives the task information output from the task registration setting unit 26. In addition, when the task information is output from the transmitting and receiving information processing unit 31, the task information share unit 27 receives the output task information. The task information output from the transmitting and receiving information processing unit 31 is task information that is transmitted from the second portable terminal 3 of another user. The task information share unit 27 generates share task information on the basis of the task information output from the task registration setting unit 26 and the task information output from the transmitting and receiving information processing unit 31. The task information share unit 27 stores the generated share task information in the task storage unit 28. In addition, similarly in the task registration setting unit 26 in the second portable terminal 3, the task information share unit 27 generates share task information on the basis of the task information output from the task registration setting unit 26 and the task information output from the transmitting and receiving information processing unit 31 and stores the generated share task information in the task storage unit 28. In the task storage unit 28 in the portable terminals 2 and 3, the same share task information is stored. Accordingly, the portable terminals 2 and 3 share the task information. In addition, the task information share unit 27 outputs the task information output from the task registration setting unit 26 to the notification terminal setting unit 29.

The notification terminal setting unit 29 sets a portable terminal (hereinafter referred to as a "notification terminal") configured to perform a reminder notification on the basis of the task information output from the task information share unit 27. For example, when a task included in the task information output from the task information share unit 27 is a task related to a request, the notification terminal setting unit 29 sets the second portable terminal 3 of another user as the notification terminal. In addition, when a task related to the task information output from the task information share unit 27 is a task related to an offer, the notification terminal setting unit 29 sets the first portable terminal 2 as the notification terminal.

On the other hand, when a task related to task information output from the task information share unit 27 is a task related to a request, the notification terminal setting unit 29 sets the first portable terminal 2 as the notification terminal. However, when notification terminal information is added to the task information output from the transmitting and receiving information processing unit 31, the notification terminal is set on the basis of the notification terminal information. The notification terminal setting unit 29 outputs notification terminal information about the set notification terminal and the task information to the transmitting and receiving information processing unit 31 and the task completion detection unit 33.

The task acceptance detection unit 30 decides whether the user has accepted the task on the basis of the task acceptance status information output from the input information processing unit 24. The task acceptance detection unit 30 outputs task acceptance result information according to the decision result of whether the task has been accepted to the transmitting and receiving information processing unit 31.

The transmitting and receiving information processing unit 31 generates first transmitting and receiving information based on the task information and task request information output from the task registration setting unit 26, the notification terminal information output from the notification terminal setting unit 29, and the task acceptance result information output from the task acceptance detection unit 30, and outputs the generated information to the transmitting and receiving unit 50.

The transmitting and receiving unit 50 transmits the first transmitting and receiving information output from the transmitting and receiving information processing unit 31 to the second portable terminal 3 via the network 4. The transmitting and receiving unit 50 receives the first transmitting and receiving information transmitted from the second portable terminal 3 and outputs the received information to the transmitting and receiving information processing unit 31. The transmitting and receiving information processing unit 31 acquires the task information, the task acceptance result information, and the task request information based on the first transmitting and receiving information output from the transmitting and receiving unit 50. The transmitting and receiving information processing unit 31 outputs the acquired task information to the task information share unit 27. The transmitting and receiving information processing unit 31 outputs the acquired task request information and task acceptance result information to the task acceptance and request notification unit 32.

The transmitting and receiving information processing unit 31 generates second transmitting and receiving information based on the task executable information and task completion information output from the task completion detection unit 33 and outputs the generated information to the transmitting and receiving unit 50. The transmitting and receiving unit 50 transmits the second transmitting and receiving information output from the transmitting and receiving information processing unit 31 to the second portable terminal 3 via the network 4. The transmitting and receiving unit 50 receives the second transmitting and receiving information transmitted from the second portable terminal 3 and outputs the received information to the transmitting and receiving information processing unit 31. The transmitting and receiving information processing unit 31 acquires the task executable information and the task completion information based on the output second transmitting and receiving information. The transmitting and receiving information processing unit 31 outputs the acquired task executable information and task completion information to the reminder notification information generation unit 35. The task executable information and the task completion information will be described in detail.

The task acceptance and request notification unit 32 decides whether another user has accepted the target task on the basis of the task acceptance result information output from the transmitting and receiving information processing unit 31. Then, when the other user has accepted the target task, task acceptance information is output to the display image control unit 36, the voice control unit 37, and the vibration control unit 38. When the task request information is output from the transmitting and receiving information processing unit 31, the task acceptance and request notification unit 32 outputs the task request notification information to the display image control unit 36, the voice control unit 37, and the vibration control unit 38.

FIG. 5 is a diagram showing an example of candidate site information data. As shown in FIG. 5, the candidate site information DB 34 stores a candidate site in which the target task can be completed. In addition, in the candidate site information DB 34, a name or an abbreviation of the candidate site with which an address is associated as candidate site information is stored. For example, when the target task is "buying vegetables," a convenience store A to a convenience store D, and supermarkets A and B are candidate sites. When meeting at the nearest station is the target task, if a station A is the nearest station, the candidate site is the nearest station A. The task completion detection unit 33 decides the candidate site according to the target task, reads candidate site information from the candidate site information DB 34, and performs task completion detection. However, the candidate site in which the target task is completed is read from the candidate site information DB 34 or the registered user may designate a task completion site when the target task is registered. In addition, the candidate site stored in the candidate site information DB 34 may be updated at any time. If the task completion site is designated when the target task is registered, the registered user may add and register the task completion site to the candidate site information DB 34 as a new candidate site. While an example in which a candidate site address is associated with the candidate site is shown in FIG. 5, another form may be possible. For example, a latitude and a longitude of the candidate site may be associated with the candidate site.

The task completion detection unit 33 decides whether task completion detection is to be performed on the basis of the notification terminal information output from the notification terminal setting unit 29. When the first portable terminal 2 is the notification terminal, the task completion detection unit 33 performs task completion detection. When the task completion detection is performed, the task completion detection unit 33 reads information about the candidate site in which the execution user can complete the task from the candidate site information DB 34 according to the task information output from the notification terminal setting unit 29. The execution user may be a user who possesses the notification terminal or a user who possesses a terminal other than the notification terminal. In addition, the execution user may be a user who possesses the registration terminal or a user who possesses the share terminal.

The task completion detection unit 33 decides whether the target task is executable on the basis of the candidate site information read from the candidate site information DB 34 and the own position information of the execution user output from the own position determination unit 25. The task completion detection unit 33 outputs the task executable information to the reminder notification information generation unit 35 and the transmitting and receiving information processing unit 31 when it is decided that the candidate site based on the candidate site information and the own position based on the own position information match or are within a predetermined range and the execution user is capable of executing the task. Also, when the target task is executable, executable conditions are satisfied.

In addition, the task completion detection unit 33 performs task completion detection when the execution user is capable of executing the task. When the task information is information about a task that is arrival at the candidate site, the task completion detection unit 33 detects executability of a task and target task completion at the same time. For example, when the target task based on the task information is meeting the registered user at the nearest station, the target task completion is detected according to arrival of the registered user at the nearest station. Alternatively, the target task completion is detected on the basis of the input task completion information output from the input information processing unit 24. For example, when the target task is buying vegetables, the task completion detection unit 33 detects target task completion if the input task completion information about "buying vegetables" is output from the input information processing unit 24. The task executability and the task completion will be further described when each of the following pattern A to pattern C is described below. When completion of the target task based on the task information is detected, the task completion detection unit 33 outputs the task completion information to the reminder notification information generation unit 35 and the transmitting and receiving information processing unit 31.

When the task executable information is output from the transmitting and receiving information processing unit 31 and the task completion detection unit 33, the reminder notification information generation unit 35 generates executable notification information. When the task completion information is output from the transmitting and receiving information processing unit 31 and the task completion detection unit 33, the reminder notification information generation unit 35 generates completion notification information. The reminder notification information generation unit 35 outputs the generated executable notification information and completion notification information to the display image control unit 36, the voice control unit 37, and the vibration control unit 38. Both the executable notification information and the completion notification information are referred to as reminder notification information.

The display image control unit 36 controls an image displayed on the image display unit 41. The display image control unit 36 generates request notification image information corresponding to the task request notification information output from the task acceptance and request notification unit 32. The display image control unit 36 generates acceptance notification image information corresponding to the task acceptance information output from the task acceptance and request notification unit 32. The display image control unit 36 generates reminder notification image information corresponding to the reminder notification information output from the reminder notification information generation unit 35. The reminder notification image information includes executable notification image information corresponding to the executable notification information and completion notification image information corresponding to a completion notification image. The display image control unit 36 outputs the generated acceptance notification image information, request notification image information, and reminder notification image information to the image display unit 41.

The voice control unit 37 controls a voice produced from the speaker 42. The voice control unit 37 generates request notification voice information corresponding to the task request notification information output from the task acceptance and request notification unit 32. The voice control unit 37 generates acceptance notification voice information corresponding to the task acceptance information output from the task acceptance and request notification unit 32. The voice control unit 37 generates reminder notification voice information corresponding to reminder notification information output from the reminder notification information generation unit 35.

The reminder notification voice information includes executable notification voice information corresponding to the executable notification information and completion notification voice information corresponding to the completion notification image. The voice control unit 37 outputs the generated acceptance notification voice information, request notification voice information, and reminder notification voice information to the speaker 42.

The vibration control unit 38 controls a vibration of the vibrator 43. The vibration control unit 38 generates request notification vibration information corresponding to the task request notification information output from the task acceptance and request notification unit 32. The vibration control unit 38 generates acceptance notification vibration information corresponding to the task acceptance information output from the task acceptance and request notification unit 32. The vibration control unit 38 generates reminder notification vibration information corresponding to the reminder notification information output from the reminder notification information generation unit 35. The reminder notification vibration information includes executable notification vibration information corresponding to the executable notification information and completion notification vibration information corresponding to the completion notification image. The vibration control unit 38 outputs the generated acceptance notification vibration information, request notification vibration information, and reminder notification vibration information to the vibrator 43.

The image display unit 41 includes a liquid crystal display panel provided in a touch panel along with the touch input unit 11. The image display unit 41 displays an acceptance notification image corresponding to the acceptance notification image information output from the display image control unit 36. The image display unit 41 displays a request notification image corresponding to the request notification image information output from the display image control unit 36. The image display unit 41 displays a reminder notification image corresponding to the reminder notification image information output from the display image control unit 36. The reminder notification image includes an executable notification image corresponding to the executable notification image information and the completion notification image corresponding to the completion notification image information.

The request notification image is an image showing that the registered user requests execution of the target task from the execution user and includes, for example, a text image of "I need someone to shop for me." The acceptance notification image is an image showing that the execution user has accepted a request in response to the request from the registered user, and includes, for example, a text image of "I can do it." For example, in a registration terminal 2, the registered user touches the please icon 200 shown in FIG. 3A and requests the execution user to buy vegetables. In this case, when the execution user touches the OK icon 410 shown in FIG. 3B and accepts the request, the acceptance notification image is displayed on the touch panel of the registration terminal 2.

The executable notification image is an image showing that the execution user has arrived at the candidate site together with an image showing a map and a position of the candidate site according to the target task in the map. For example, in the registration terminal 2, the registered user touches the please icon 200 shown in FIG. 3A and requests the execution user to buy vegetables. In this case, the executable notification image is an image that is displayed when the execution user has arrived at the convenience stores A to D or the supermarkets A and B in which vegetables can be bought.

The completion notification image is an image showing that the execution user has completed the target task. For example, in the registration terminal 2, the registered user touches the please icon 200 shown in FIG. 3A and requests the execution user to buy vegetables. In this case, the completion notification image is an image that is displayed when the fact that the execution user has arrived at the candidate site and has bought vegetables is input to the touch input unit 11 or the sound collection unit 12. In addition, when the registered user touches the please icon 200 shown in FIG. 3A and requests to meet at the nearest station, no executable notification image is displayed. When the execution user arrives at the nearest station, the completion notification image is displayed. In addition, in this case, the completion notification image is displayed without performing, by the task performer, manipulation of the touch input unit 11 and a voice input to the sound collection unit 12.

The speaker 42 produces a request notification sound corresponding to the request notification voice information output from the voice control unit 37, an acceptance notification sound corresponding to the acceptance notification voice information output from the voice control unit 37, and a reminder notification sound corresponding to the reminder notification voice information. The reminder notification sound includes an executable notification sound corresponding to the executable notification voice information and a completion notification sound corresponding to completion notification voice information. The request notification sound is a sound indicating content that the registered user requests the execution user to execute the target task, for example, an utterance of the phrase "Please buy vegetables for me." The acceptance notification sound is a sound indicating content that the request from the registered user is accepted, for example, an utterance of the phrase "I can do it." The request notification sound and the acceptance notification sound may be an utterance of another phrase, or may be a sound other than the voice.

The executable notification sound is a sound indicating that the request to the registered user is executable, for example, an utterance of the phrase "I've arrived at a store where I can buy them." The executable notification sound may be a voice uttering another phrase, or may be a sound other than the voice. The completion notification sound is a sound indicating that the request from the registered user has been completed, for example, a voice uttering the phrase "I bought them." The completion notification sound may be a voice uttering another phrase and may be a sound other than the voice.

The vibrator 43 produces the acceptance notification vibration corresponding to the acceptance notification vibration information output from the vibration control unit 38 and the reminder notification vibration corresponding to the reminder notification vibration information. The reminder notification vibration includes an executable notification vibration corresponding to executable notification vibration information and a completion notification vibration corresponding to completion notification vibration information. The acceptance notification vibration, the executable notification vibration, and the completion notification vibration may be a vibration of the same vibration pattern or a vibration of different vibration patterns.

In addition, two of the acceptance notification vibration, the executable notification vibration, and the completion notification vibration may have the same vibration pattern and the other vibration may have a different vibration pattern.

The transmitting and receiving unit 50 transmits the transmitting and receiving information output from the transmitting and receiving information processing unit 31 to the second portable terminal 3 via the network 4. The transmitting and receiving unit 50 outputs the transmitting and receiving information transmitted from the second portable terminal 3 via the network 4 to the transmitting and receiving information processing unit 31. The transmitting and receiving information includes first transmitting and receiving information including task information and task acceptance result information and second transmitting and receiving information including task executable information and task completion information. The first transmitting and receiving information and the second transmitting and receiving information are divided only for the convenience of description. In transmitting and receiving procedures, there is no difference between the first transmitting and receiving information and the second transmitting and receiving information.

In the reminder notification system having the above configuration, the target task, which is a task registered in the registration terminal 2, is shared between the registration terminal 2 and the share terminal 3. Therefore, a collaborative process can be performed between the registration terminal 2 and the share terminal 3. Hereinafter, a collaboration process using the registration terminal 2 and the share terminal 3 will be described.

As an aspect of the collaboration process, various forms shown in FIG. 4 are considered based on a relation between the share task information generated in the task information share unit 27 and the notification terminal set in the notification terminal setting unit 29. FIG. 4 is a diagram showing an example of a pattern of a collaboration process. The pattern A is a pattern in which the registered user and the execution user are the same. The pattern B and the pattern C are patterns in which the registered user and the execution user are different. When the registered user and the execution user are different, the execution user is a user who possesses the share terminal 3 and is a user who performs the target task. Hereinafter, the user who possesses the share terminal 3 is referred to as a share user.

The collaboration process of the pattern A is used, for example, when the registered user at home wants to meet the share user who is out and about at a station. The pattern is a pattern in the registered user offers to meet the share user. The registered user touches the help icon 300 and the meet icon 310 shown in FIG. 3A and sets notification of the reminder. In the pattern A, when the share user arrives at the station, the registered user is notified of the reminder. In the pattern A, a task trigger performer is the share user, and the task performer is the registered user. The task trigger is a trigger that can cause the target task to be executable. In the pattern A, the arrival of the share user at the station is the task trigger, and meeting the registered user at the station is a registered task.

The collaboration process of the pattern B is used, for example, when the registered user who is out and about requests to meet the share user who is at home at the station. The pattern is a pattern in which the registered user requests to meet the share user. The registered user touches the please icon 200 and the meet icon 210 shown in FIG. 3A and sets notification of the reminder. In the pattern B, when the registered user arrives at the station, the share user is notified of the reminder. In addition, in the pattern B, when the share user confirms the reminder and performs a confirmation process, the registered user is notified of completion of the reminder. In the pattern B, the task trigger performer is the registered user, and the task performer is the share user. In addition, in the pattern B, the arrival of the share user at the station is the task trigger, and meeting the registered user at the station is the registered task.

The collaboration process of the pattern C is used, for example, when the registered user at home requests the share user who is out and about to shop. The pattern is a pattern in which the registered user requests the share user to shop. The registered user touches the please icon 200 and the shopping icon 220 shown in FIG. 3A and sets notification of the reminder. In the pattern B, when the share user arrives at the candidate site where it is possible to shop, the share user is notified of the reminder. In addition, in the pattern C, when the share user confirms the reminder and performs a confirmation process or when the shopping is finished and the target task is completed, the registered user is notified of completion of the reminder. In the pattern C, both of the task trigger performer and the task performer are the share user. In addition, in the pattern C, the arrival of the share user at a store where it is possible to shop is the task trigger, and shopping is the registered task. Hereinafter, processes of the reminder notification system in the pattern A to the pattern C will be described.

<Pattern A>

Figure 6:
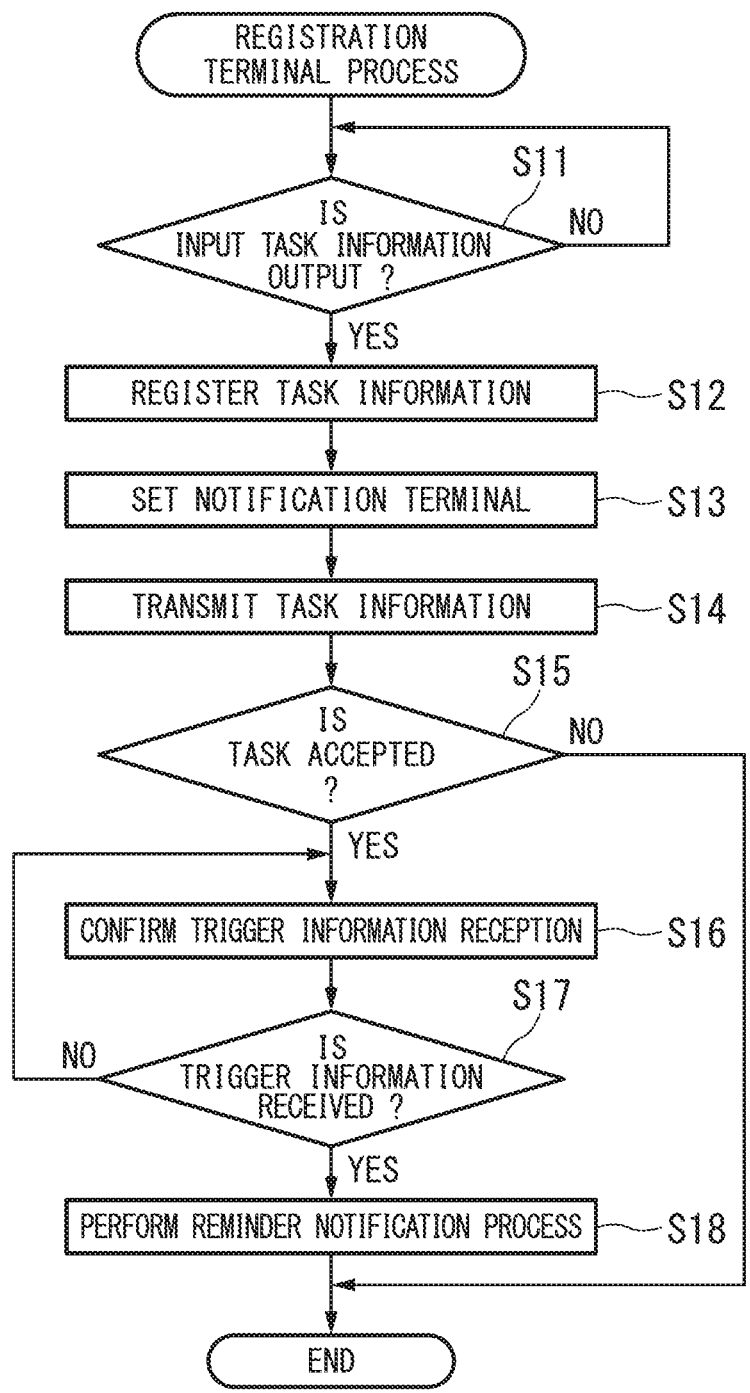
FIG. 6 is a flowchart showing processing procedures of a registration terminal in a pattern A.
Figure 7:
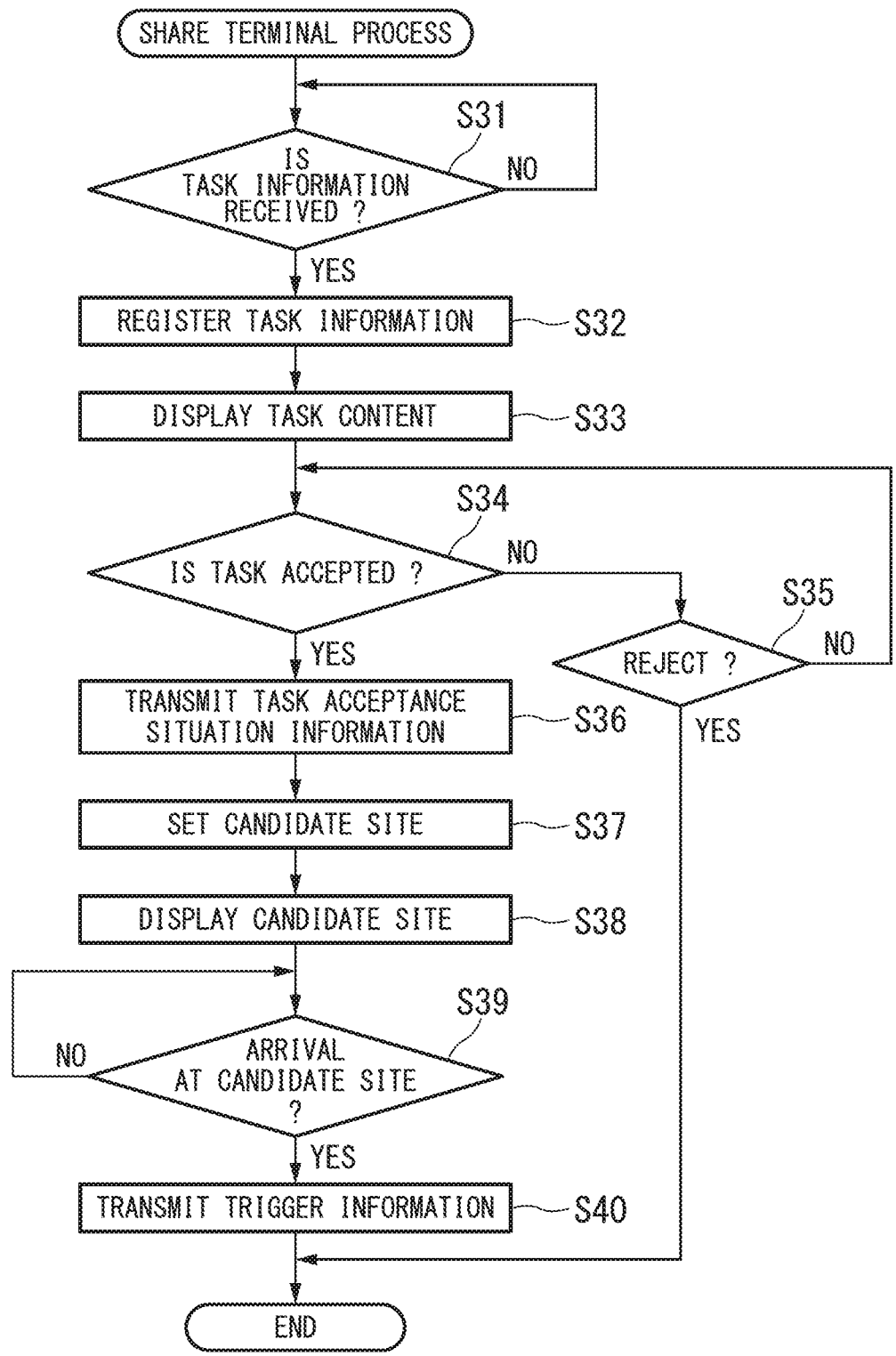
FIG. 7 is a flowchart showing processing procedures of a share terminal in the pattern A.

Next, collaboration processing procedures of the pattern A will be described. FIG. 6 is a flowchart showing processing procedures of the registration terminal in the pattern A. FIG. 7 is a flowchart showing processing procedures of the share terminal in the pattern A. As shown in FIG. 6, the registration terminal 2 decides whether the input task information corresponding to an input from the touch input unit 11 or the sound collection unit 12 has been output from the input information processing unit 24 (Step S11). When no input task information has been output based on the decision result (NO in Step S11), the registration terminal 2 repeats the decision in Step S11 until the input task information has been output.

On the other hand, when the input task information has been output (YES in Step S11), the task information share unit 27 stores the task information in the task storage unit 28 (Step S12). Next, the notification terminal setting unit 29 sets the notification terminal (Step S13). In the pattern A, the registration terminal 2 is set as the notification terminal. The notification terminal may be decided by the notification terminal setting units 29 in both of the registration terminal 2 and the share terminal 3. Alternatively, the notification terminal may be decided by the notification terminal setting unit 29 in one of the registration terminal 2 and the share terminal 3, and the information may be provided to the other terminal. Then, the first portable terminal 2 transmits the task information from the transmitting and receiving unit 50 to the share terminal 3 via the network 4 (Step S14).

Then, the control unit 20 decides whether the target task is has been accepted (Step S15). The control unit 20 decides whether target task has been accepted on the basis of the task acceptance status information transmitted from the share terminal 3. When the target task has not been accepted by the share user who possesses the share terminal 3, based on the decision result (NO in Step S15), the target task is rejected and the control unit 20 directly ends the process in the registration terminal 2.

On the other hand, when the target task has been accepted by the share user who possesses the share terminal 3 (YES in Step S15), the control unit 20 performs reception confirmation of trigger information (Step S16). Next, the control unit 20 performs a reception confirmation process of the trigger information in which it is decided whether the trigger information has been received (Step S17). When no trigger information has been received, based on the decision result (NO in Step S17), the control unit 20 returns to Step S16, and repeats reception confirmation of trigger information.

On the other hand, in Step S17, when the trigger information has been received (YES in Step S17), the reminder notification information generation unit 35 performs a reminder notification process (Step S18). The reminder notification information generation unit 35 generates task completion information in the reminder notification process and outputs the generated information to the display image control unit 36, the voice control unit 37, and the vibration control unit 38. Then, the display image control unit 36 displays the completion notification image on the image display unit 41, the voice control unit 37 produces a completion notification sound from the speaker 42, and the vibration control unit 38 causes the vibrator 43 to be vibrated at a pattern of the completion notification vibration. Therefore, the process in the registration terminal 2 ends.

Next, the process of the share terminal 3 will be described. As shown in FIG. 7, the share terminal 3 decides whether task information has been received (Step S31). The task information is task information transmitted in Step S14 in the process of the registration terminal 2. When no task information has been received, based on the decision result (NO in Step S31), the share terminal 3 repeats the process in Step S31 until the task information is received.

On the other hand, in Step S31, when the task information has been received (YES in Step S31), the transmitting and receiving information processing unit 31 outputs the received task information to the task information share unit 27 as share task information. The task information share unit 27 stores the output share task information in the task storage unit 28 (Step S32). The share task information registered in the task information share unit 27 of the registration terminal 2 is also registered in the task information share unit 27 of the share terminal 3. According to the above process, the task information is shared between the registration terminal 2 and the share terminal 3.

Next, the transmitting and receiving information processing unit 31 outputs the received task information to the task acceptance and request notification unit 32. The task acceptance and request notification unit 32 outputs the task request notification information to the display image control unit 36. Next, the display image control unit 36 generates request notification image information corresponding to the task request notification information and displays the request notification image on the image display unit 41 (Step S33).

Next, the task acceptance detection unit 30 decides whether the share user has accepted the target task (Step S34). The decision is performed on the basis of the task acceptance status information output from the input information processing unit 24. When the share user has not accepted the target task, based on the decision result (NO in Step S34), the task acceptance detection unit 30 decides whether the share user has rejected the target task (Step S35). When the share user has not rejected the target task, based on the decision result (NO in Step S35), the process returns to Step S33, and the task acceptance detection unit 30 decides whether the share user has accepted the target task. When it is decided that the share user has rejected the target task (YES in Step S35), the control unit 20 directly ends the process in the share terminal 3.

On the other hand, in Step S33, when the share user has accepted the target task (YES in Step S34), the task acceptance detection unit 30 transmits task acceptance result information to the registration terminal 2 (Step S36). The task acceptance result information transmitted to the registration terminal 2 in Step S36 is used to decide whether the task has been accepted in Step S15 (FIG. 6) in the process of the registration terminal 2. Then, the task completion detection unit 33 sets a candidate site at which the share user is to arrive (Step S37). The task completion detection unit 33 sets the candidate site at which the share user is to arrive on the basis of the output task information. When the candidate site is set, the display image control unit 36 displays the candidate site, a map of the vicinity of the candidate site, and the like on the image display unit 41 (Step S38).

Next, the task completion detection unit 33 decides whether the share user has arrived at the candidate site (Step S39). The task completion detection unit 33 performs the decision by comparing own position information of the share user output from the own position determination unit 25 with position information of the candidate site. When the share user has not arrived at the candidate site, based on the decision result (NO in Step S39), the task completion detection unit 33 repeats the process in Step S39. On the other hand, when the share user has arrived at the candidate site (YES in Step S39), the share terminal 3 transmits trigger information indicating that the share user has arrived at the candidate site and the task trigger is performed in the registration terminal 2 (Step S40).

Reception confirmation of the trigger information transmitted to the registration terminal 2 in Step S40 is performed in the reception confirmation process of the trigger information in Step S17 (FIG. 6) in the process of the registration terminal 2. Thus ends the process in the share terminal 3.

Figure 8:
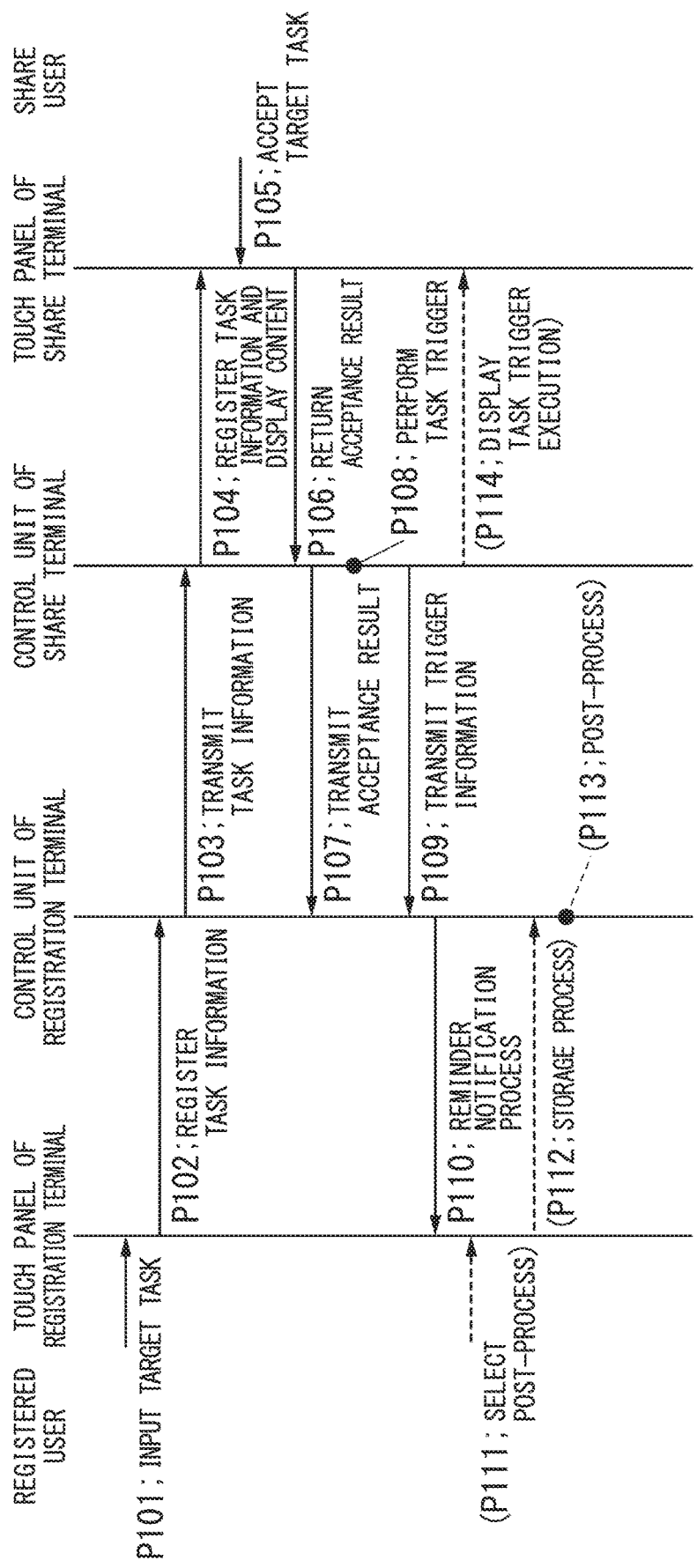
FIG. 8 is a diagram showing a signal flow between a registration terminal and a share terminal in time series in the pattern A.
Figure 9:
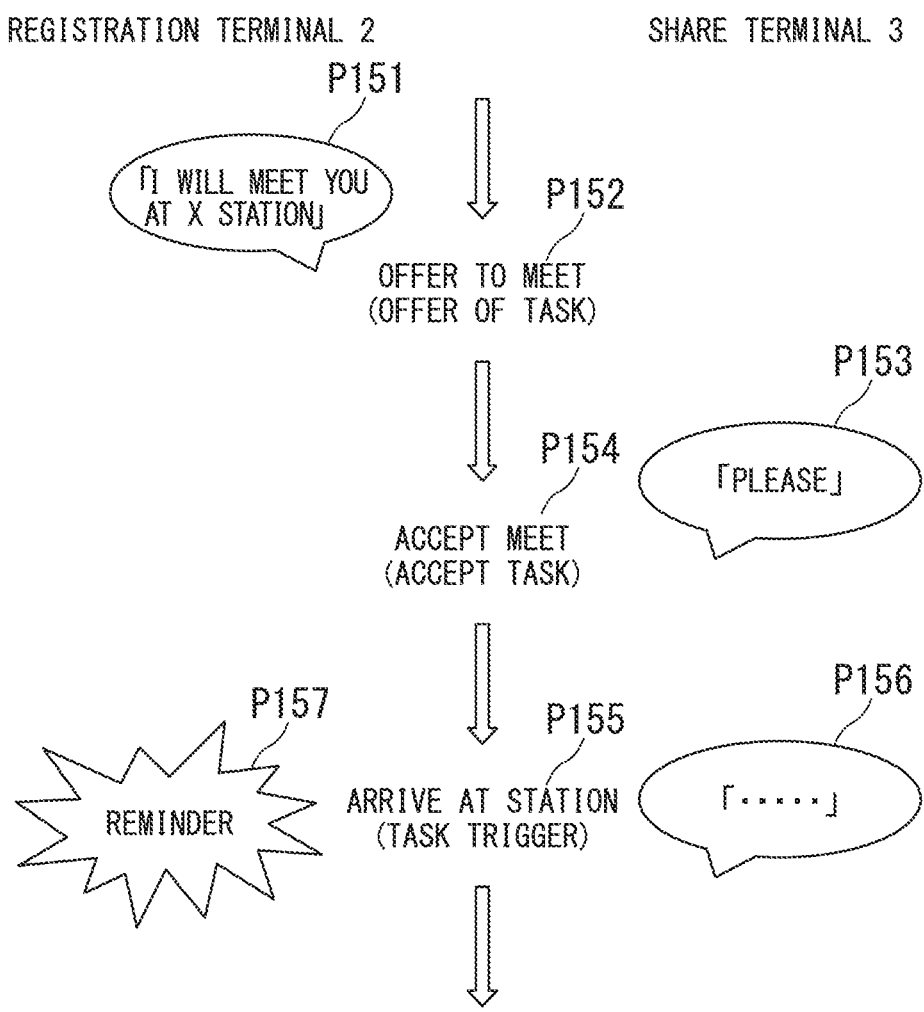
FIG. 9 is a diagram showing an example of an exchange between a registration terminal and a share terminal in the pattern A.

The above-described information transmission and reception between the registration terminal 2 and the share terminal 3 will be collectively described in time series. FIG. 8 is a diagram showing a signal flow between the registration terminal 2 and the share terminal 3 in time series in the pattern A. FIG. 9 is a diagram showing an example of an exchange between the registration terminal and the share terminal in the pattern A. As shown in FIG. 8, in the registration terminal 2, the registered user inputs the target task using the touch panel of the registration terminal 2 (P101). The task registration setting unit 26 of the registration terminal 2 applies the input task information about the input target task to a use case of a collaboration processing pattern correspondence table shown in FIG. 5 and selects the pattern A. In an example of the pattern A, when the nearest station of the registered user is X Station, the target task is a task in which the registered user meets the share user at X Station. As shown in FIG. 9, the registered user inputs the message of "I will meet you at X Station" (P151) to the sound collection unit 12 of the registration terminal 2. In this manner, the target task is set and an offer to meet (an offer of the task) is performed (P152). Alternatively, the registered user touches the help icon 300 and the meet icon 310 shown in FIG. 3A. Alternatively, a registered user 3 manipulates an icon (not shown) to input the fact that he or she will meet the share user at X Station. In this manner, the target task is registered.

When the input of the target task is completed, the control unit 20 of the registration terminal 2 performs a registration process of the target task. Specifically, the task registration setting unit 26 generates task information. The task information share unit 27 stores (registers) the task information in the task storage unit 28 (P102). In addition, in this case, the notification terminal setting unit 29 decides the notification terminal. In the pattern A, the notification terminal setting unit 29 of the registration terminal 2 decides the registration terminal 2 as the notification terminal.

Next, the registration terminal 2 transmits the generated task information to the share terminal 3 (P103). In the share terminal 3, the transmitted task information is registered, and content of the task information is displayed (P104). The task information is registered in the task information share unit 27 of the share terminal 3. In addition, the task information is displayed on the image display unit 41 of the share terminal 3.

When the share user who possesses the share terminal 3 sees the display of the task information and accepts the target task (P105), the share user performs input of task acceptance. As the display of the task information, "There was an offer to meet you at X Station" is displayed as the message 400 shown in FIG. 3B. In order to accept the target task, the share user touches the OK icon 410. On the other hand, in order to reject the target task, the share user touches the NG icon 420. By touching the OK icon 410 or the NG icon 420, the acceptance result is returned to the control unit 20 (P106). Alternatively, the share user inputs or selects the message of "Please" (P153) shown in FIG. 9 using the sound collection unit 12 of the registration terminal 2. In this manner, the meeting is accepted (the task is accepted) (P154), and the acceptance result is returned to the control unit 20 (P106).

When the share user touches the OK icon 410 or the NG icon 420, the task acceptance result information is transmitted from the share terminal 3 to the registration terminal 2 (P107). Then, in the share terminal 3, it is decided whether the task trigger has been performed. Specifically, it is decided whether the share user has arrived at the candidate site. A time at which the share user arrives at the candidate site is a time at which the task is executable in the pattern A.

Then, when the share user has arrived at the candidate site and the task trigger has been performed (P108 and P155), trigger information is transmitted from the share terminal 3 to the registration terminal 2 (P109). When the trigger information is received, the registration terminal 2 performs the reminder notification process (P110). Therefore, as shown in FIG. 9, the share user does not perform an input to the share terminal 3 (P156), and the reminder notification is performed in the registration terminal 2 (P157). According to the reminder notification process, the image display unit 41 of the registration terminal 2 displays the completion notification image, the speaker 42 produces the completion notification sound, and the vibrator 43 vibrates at a pattern of the completion notification vibration. In the above process, the registration terminal 2 performs the reminder notification for the registered user. The registered user who has received the reminder notification recognizes the arrival of the share user at X Station. The registered user receives the reminder and is able to meet the share user at X Station. Also, instead of an example in which the reminder notification is performed when the share user has arrived at the candidate site (X Station), the reminder notification may be performed before the share user arrives at the candidate site. A time before arrival at the candidate site may be a time when the share user enters a range close to the candidate site, for example, enters a range of 500 m or 1 km from the candidate site.

Alternatively, a few minutes before an expected time of arrival at the candidate site, for example, a time 10 minutes or 5 minutes before may be exemplified. In addition, such a distance or time can be set by the registered user or the share user.

In the pattern A, in the registration terminal 2, after the reminder notification process is performed, processes related to post-processing (a post-process selection, a storage process, and a post-process) may be performed. The registration terminal 2 may perform post-processing on the display of the reminder notification image by the image display unit 41, the reminder notification sound from the speaker 42, and the reminder notification vibration by the vibrator 43 (hereinafter referred to as a "total reminder notification") (P113). In the pattern A, the target task is a task in which the registered user meets the share user when the share user arrives at the candidate site. Therefore, when completion conditions of the task are satisfied, the registered user and the share user meet at the candidate site. Accordingly, the share user may not perform a task completion notification for the registered user. However, in order to notify the registered user of the fact that the share user has arrived at the candidate site, the share user reminds the registered user of the task completion notification.

The post-process is a process in which, when the total reminder notification continues for a certain continuation time, the total reminder notification ends once, and when a certain lapse of time elapses again, the total reminder notification is resumed. The post-process is continuously performed until a delete process is performed. In the post-process selection (P111), a selection about whether the post-process is to be performed may be input. In addition, the registered user may select the delete process in the post-process selection. In the storage process (P112), a process of outputting information for registering whether to perform the post-process or the delete process selected in the post-process selection in the control unit 20 may be performed. The registration terminal 2 may set the certain continuation time and the certain lapse of time which may be common or different times.

In addition, after the trigger information is transmitted to the registration terminal 2, the share terminal 3 may display a task trigger execution notification indicating that the task trigger has been performed (P114) on the image display unit 41.

<Pattern B>

Figure 10:
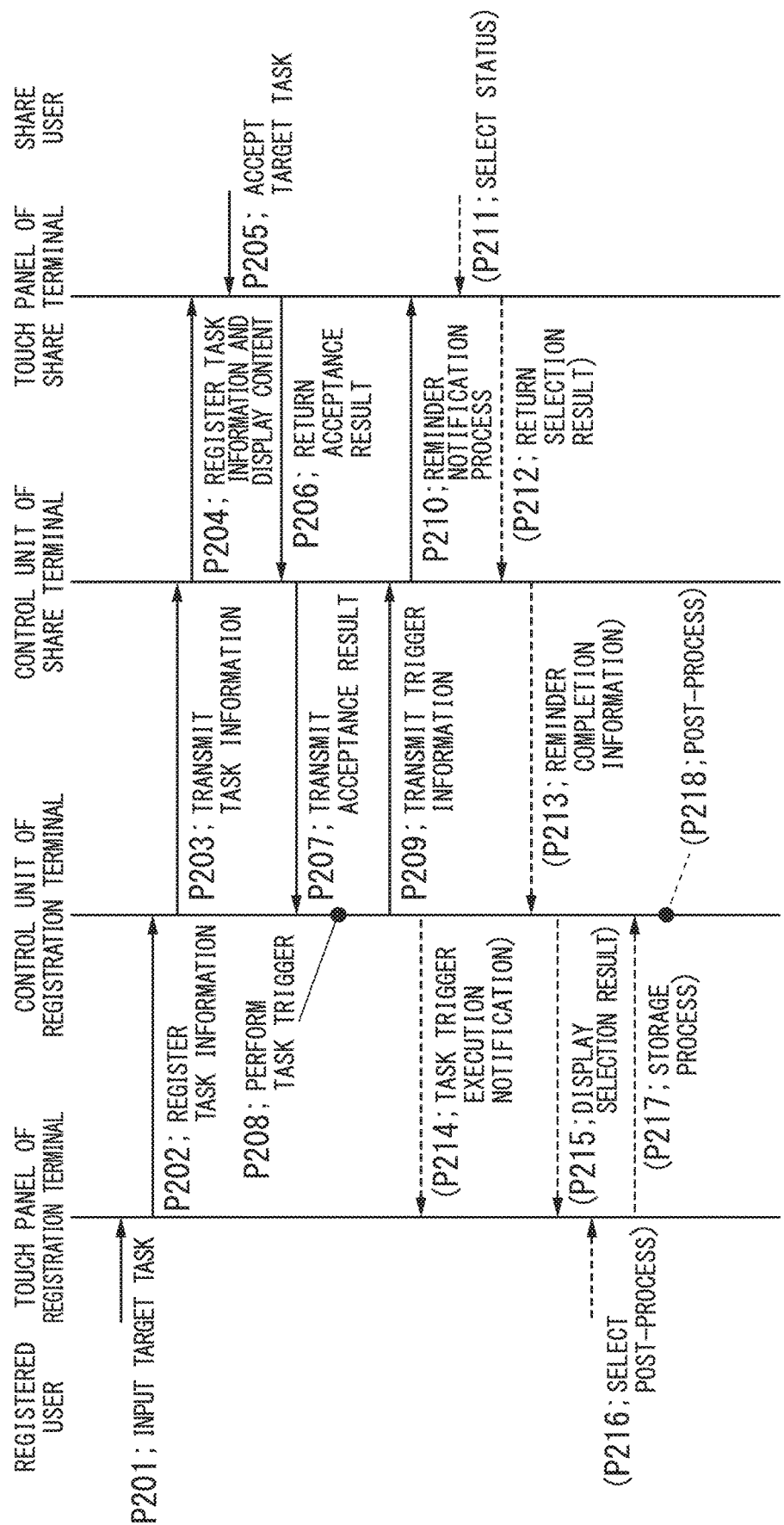
FIG. 10 is a diagram showing a signal flow between a registration terminal and a share terminal in time series in a pattern B.
Figure 11:
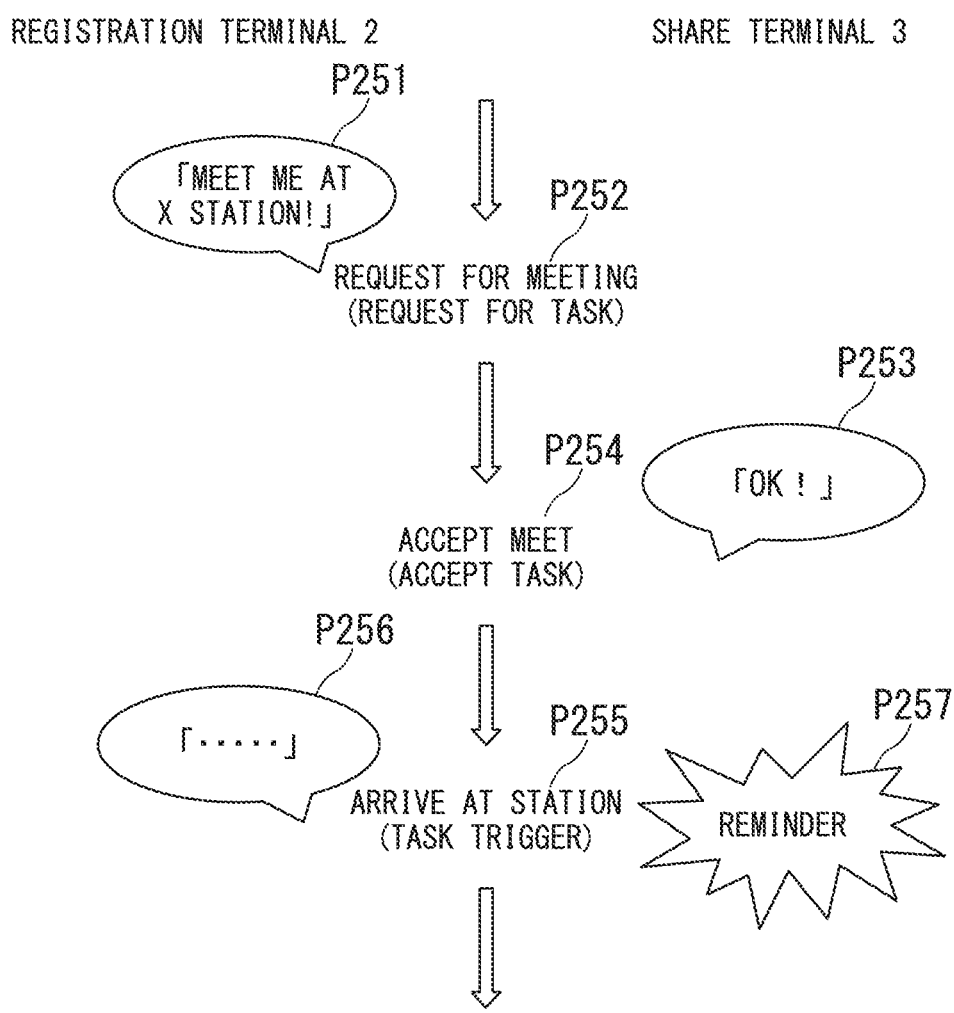
FIG. 11 is a diagram showing an example of an exchange between a registration terminal and a share terminal in the pattern B.

Next, information transmission and reception between the registration terminal 2 and the share terminal 3 in time series in the pattern B will be collectively described. FIG. 10 is a diagram showing a signal flow between the registration terminal 2 and the share terminal 3 in time series in the pattern B. FIG. 11 is a diagram showing an example of an exchange between the registration terminal and the share terminal in the pattern B. As shown in FIG. 10, in the registration terminal 2, the registered user inputs the target task using the touch panel of the registration terminal 2 (P201). The task registration setting unit 26 of the registration terminal 2 applies the input task information about the input target task to a use case of the collaboration processing pattern correspondence table shown in FIG. 5 and selects the pattern B. In an example of the pattern B, when the nearest station of the share user is X Station, the target task is a task in which the share user meets the registered user at X Station. As shown in FIG. 11, the registered user inputs the message of "meet me at X Station!" (P251) to the sound collection unit 12 of the registration terminal 2. In this manner, the target task is set. Alternatively, in this case, the registered user touches the please icon 200 and the meet icon 210 shown in FIG. 3A. Alternatively, the registered user manipulates an icon (not shown) to input the fact that he or she wants the share user to meet him or her at X Station. In this manner, the target task is registered, and a request for meeting (a request for the task) is performed (P252).

When the input of the target task is completed, the control unit 20 of the registration terminal 2 performs a registration process of the target task. Specifically, the task registration setting unit 26 generates task information. The task information share unit 27 stores (registers) the task information in the task storage unit 28 (P202). In addition, in this case, the notification terminal setting unit 29 decides the notification terminal. In the pattern B, the notification terminal setting unit 29 of the registration terminal 2 decides the share terminal 3 as the notification terminal.

Next, the registration terminal 2 transmits the generated task information to the share terminal 3 (P203). The share terminal 3 registers the transmitted task information and displays content of the task information (P204). The task information is registered in the task information share unit 27 of the share terminal 3. In addition, the task information is displayed on the image display unit 41 of the share terminal 3.

When the share user who possesses the share terminal 3 sees the display of the task information and accepts the target task, the user performs input of task acceptance (P205). As the display of the task information, "meet me at X Station" is displayed as the message 400 shown in FIG. 3B. In order to accept the target task, the share user touches the OK icon 410. On the other hand, in order to reject the target task, the share user touches the NG icon 420. By touching the OK icon 410 or the NG icon 420, the acceptance result is returned to the control unit 20 (P206). Alternatively, the share user inputs or selects the message of "OK!" (P253) shown in FIG. 10 using the sound collection unit 12 of the registration terminal 2. In this manner, the meeting is accepted (the task is accepted) (P254), and the acceptance result is returned to the control unit 20 (P206).

When the share user touches the OK icon 410 or the NG icon 420, the task acceptance result information is transmitted from the share terminal 3 to the registration terminal 2 (P207). Then, the registration terminal 2 decides whether the task trigger has been performed. Specifically, in the task completion detection unit 33 of the registration terminal 2, it is decided whether the registered user has arrived at the candidate site. A time at which the registered user arrives at the candidate site is a time at which the task is executable in the pattern A.

Then, when the registered user has arrived at the candidate site and the task trigger has been performed (P208 and P255), trigger information is transmitted from the registration terminal 2 to the share terminal 3 (P209). When the trigger information is received, the share terminal 3 performs the reminder notification process (P210). Therefore, as shown in FIG. 11, the registered user does not perform an input to the registration terminal 2 (P256), and the share terminal 3 performs the reminder notification (P257). According to the reminder notification process, the image display unit 41 of the share terminal 3 displays the completion notification image, the speaker 42 produces the completion notification sound, and the vibrator 43 vibrates at a pattern of the completion notification vibration. In this manner, a reminder notification is performed for the registered user. The share user receives the reminder and can meet the registered user at X Station.

In the pattern B, in the share terminal 3, after the reminder notification process is performed, a process related to a status selection (P211) may be performed. The process related to a status selection is a process of selecting whether a reminder continuation process is to be performed. Similarly to the post-process, the reminder continuation process is a process in which, when the total reminder notification continues for a certain continuation time, the total reminder notification ends once, and when a certain lapse of time elapses again, the total reminder notification is resumed. In the process related to a status selection, when execution of the reminder continuation process is selected, the selection result is returned to the control unit 20 (P212), and the reminder continuation process is performed until ending the reminder continuation process is selected. In the pattern B, the target task is a task in which the share user meets the registered user when the registered user arrives at the candidate site. Therefore, when completion conditions of the task are satisfied, the registered user and the share user meet at the candidate site. Accordingly, the task completion notification may not be performed for the share user. However, in order to notify the share user of the fact that the registered user has arrived at the candidate site, it is possible to remind the share user of the task completion notification.

When the reminder continuation process ends, reminder completion information may be transmitted from the share terminal 3 to the registration terminal 2 (P213). In addition, in the registration terminal 2, after the trigger information is transmitted, task trigger execution may be displayed on the image display unit 41. As the display of the task trigger execution, the message indicating execution of the task trigger such as "I've arrived at X Station" may be displayed (P214). When the reminder completion information is transmitted, the registration terminal 2 may display the selection result in the status selection (P211) on the image display unit 41 of the registration terminal 2 (P215). Further, when the selection result or the task trigger execution is displayed on the image display unit 41 of the registration terminal 2, the registration terminal 2 may perform a total reminder completion notification by the image display unit 41, the speaker 42, and the vibrator 43. The total reminder completion notification is the same notification as the total reminder notification. However, a notification different from the total reminder notification can be used. In this case, in the registration terminal 2, a process associated with the same post-process as in the pattern A may be performed (P216 to P218).

<Pattern C>

Figure 12:
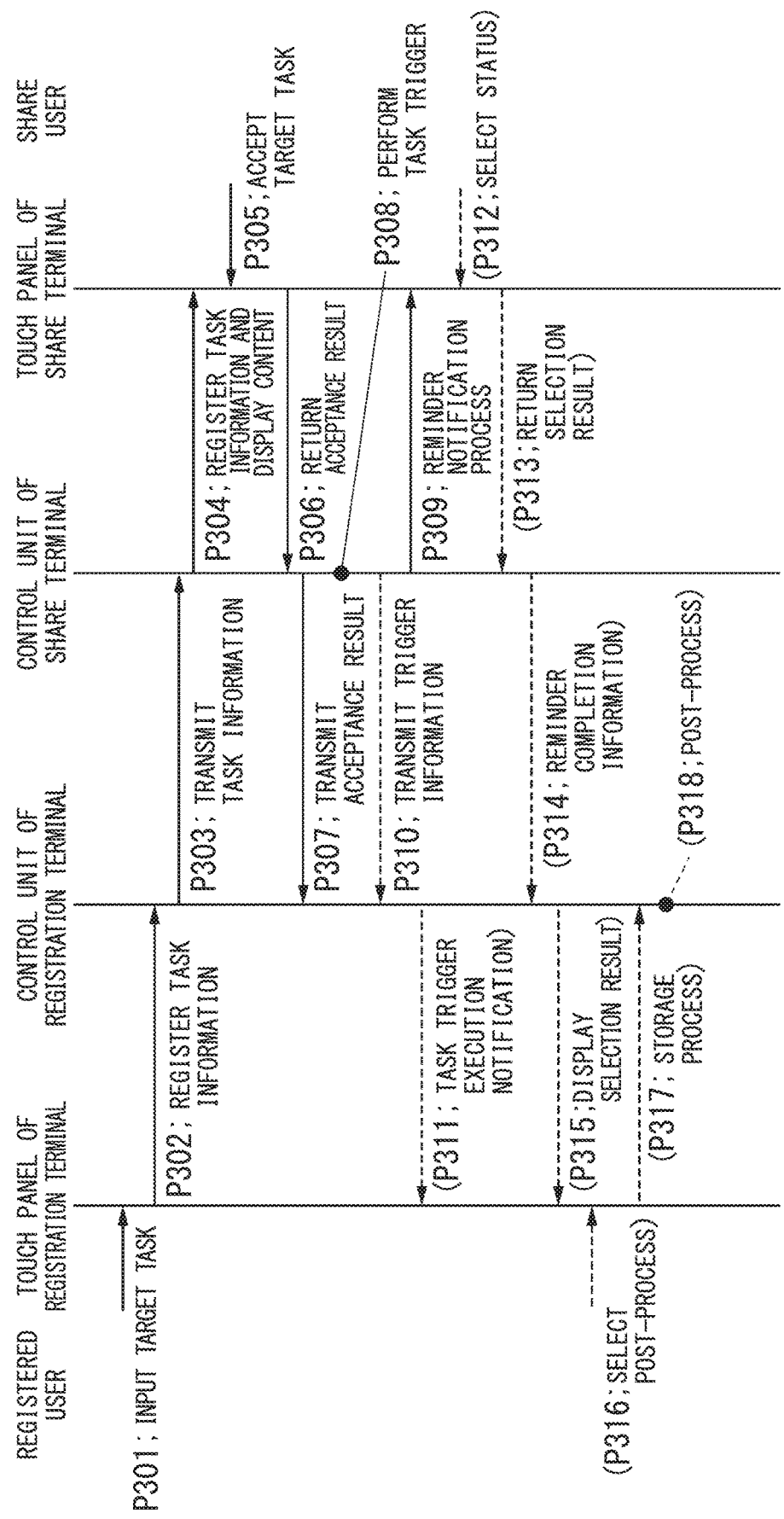
FIG. 12 is a diagram showing a signal flow between a registration terminal and a share terminal in time series in a pattern C.
Figure 13:
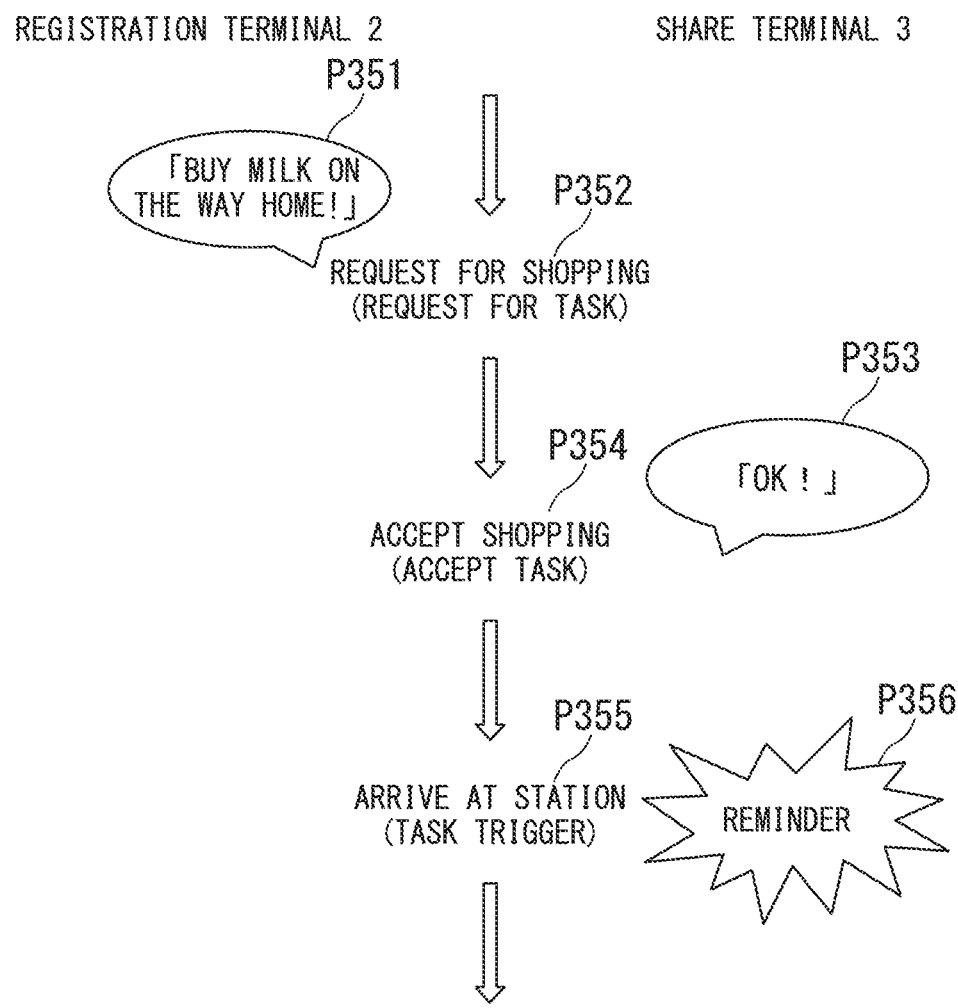
FIG. 13 is a diagram showing an example of an exchange between a registration terminal and a share terminal in the pattern C.

Next, information transmission and reception between the registration terminal 2 and the share terminal 3 in time series in the pattern C will be collectively described. FIG. 12 is a diagram showing a signal flow between the registration terminal 2 and the share terminal 3 in time series in the pattern C. FIG. 13 is a diagram showing an example of an exchange between a registration terminal and a share terminal in the pattern C. As shown in FIG. 12, in the registration terminal 2, the registered user inputs the target task using the touch panel of the registration terminal 2 (P301). The task registration setting unit 26 of the registration terminal 2 applies the input task information about the input target task to a use case of the collaboration processing pattern correspondence table shown in FIG. 5 and selects the pattern C. In an example of the pattern C, the target task is the share user buying milk. The registered user inputs the message of "Buy milk on the way home!" (P351) shown in FIG. 13 to the sound collection unit 12 of the registration terminal 2. In this manner, the target task is set. Alternatively, the registered user touches the please icon 200 and the shopping icon 220 shown in FIG. 3A. Alternatively, the registered user manipulates an icon (not shown) to input the fact that I want you to buy milk. In this manner, the target task is registered and a request for shopping (a request for the task) is performed (P352).

When the input of the target task is completed, the control unit 20 of the registration terminal 2 performs a registration process of the target task. Specifically, the task registration setting unit 26 generates task information. The task information share unit 27 stores (registers) the task information in the task storage unit 28 (P302). In addition, in this case, the notification terminal setting unit 29 decides the notification terminal. In the pattern C, the notification terminal setting unit 29 of the registration terminal 2 decides the share terminal 3 as the notification terminal.

Next, the registration terminal 2 transmits the generated task information to the share terminal 3 (P303). The share terminal 3 registers the transmitted task information and displays content of the task information (P304). The task information is registered in the task information share unit 27 of the share terminal 3. In addition, the task information is displayed on the image display unit 41 of the share terminal 3.

When the share user who possesses the share terminal 3 sees the display of the task information and accepts the target task, the user performs input of task acceptance (P305). As the display of the task information, "There was a desire for you to buy a product Y for me" is displayed as the message 400 shown in FIG. 3B. In order to accept the target task, the share user touches the OK icon 410. On the other hand, in order to reject the target task, the share user touches the NG icon 420. By touching the OK icon 410 or the NG icon 420, the acceptance result is returned to the control unit 20 (P306). Alternatively, the share user inputs or selects the message of "OK!" (P353) shown in FIG. 13 using the sound collection unit 12 of the registration terminal 2. In this manner, the shopping is accepted (the task is accepted) (P354), and the acceptance result is returned to the control unit 20 (P306).

When the share user touches the OK icon 410 or the NG icon 420, the task acceptance result information is transmitted from the share terminal 3 to the registration terminal 2 (P307). Then, the share terminal 3 decides whether the task trigger has been performed. Specifically, it is decided whether the share user has arrived at the candidate site. A time at which the share user arrives at the candidate site is a time at which the task is executable in the pattern C.

Then, when the registered user has arrived at the candidate site and the task trigger has been performed (P308 and P355), the share terminal 3 performs the reminder notification process for the share user (P309 and P356). According to the reminder notification process, the image display unit 41 of the share terminal 3 displays the executable notification image, the speaker 42 produces the executable notification sound, and the vibrator 43 vibrates at a pattern of the executable notification vibration. In this manner, a reminder notification is performed for the registered user.

The share user receives the reminder can recognize that he or she has arrived at the candidate site in which the product Y is on sale, and is able to buy the product Y.

After the share user has bought the product Y, content of "a product Y is bought" is input from the touch input unit 11 or the sound collection unit 12, the input information processing unit 24 outputs the input task completion information to the task completion detection unit 33. In the pattern C, the target task is buying, by the share user, the product Y. Therefore, when completion conditions of the task are satisfied, the registered user is notified of the reminder. The reminder of task completion information may not be performed.

In addition, in the pattern C, in the share terminal 3, after the task trigger is performed, the trigger information may be transmitted from the share terminal 3 to the registration terminal 2 (P310). In this case, the registration terminal 2 may display task trigger execution on the image display unit 41 (P311). As the display of the task trigger execution, the message indicating execution of the task trigger such as "the share user can buy the product Y" may be displayed. Further, in the share terminal 3, after the reminder notification process is performed, the process related to a status selection may be performed (P312). In the process related to a status selection, when execution of the reminder continuation process is selected, the selection result is returned to the control unit 20 (P313), and the reminder continuation process is performed until ending the reminder continuation process is selected. In this case, when the reminder continuation process ends, the reminder completion information may be transmitted from the share terminal 3 to the registration terminal 2 (P314). In the registration terminal 2, when the reminder completion information is transmitted, the selection result in the status selection (P312) may be displayed on the image display unit 41 of the registration terminal 2 (P315).

Further, when the selection result or the task trigger execution is displayed on the image display unit 41 of the registration terminal 2, the registration terminal 2 may perform the total reminder completion notification by the image display unit 41, the speaker 42, and the vibrator 43. The total reminder completion notification is the same notification as the total reminder notification. However, a notification different from the total reminder notification can be used. In this case, in the registration terminal 2, a process associated with the same post-process as in the pattern A may be performed (P316 to P318).

As described above, in the reminder notification system according to the present embodiment, since the target task is shared between the registration terminal 2 and the share terminal 3, task information about the target task can be shared between the registered user and the share user. In addition, when the target task has been performed or is executable, the notification terminal provides the reminder. Therefore, a process of executing the target task can be cooperatively performed between the registered user who possesses the registration terminal 2 and the share user who possesses the share terminal 3. Accordingly, when the target task set between the registered user and the share user is performed, it is possible to smoothly perform the process until the reminder is provided.

In addition, in the above embodiment, in the pattern A, the registered user is the execution user. In the patterns B and C, the share user is the execution user, and the registered user and the execution user are different users. Even in such cases, by sharing the task information between the registration terminal 2 and the share terminal 3, it is possible to quickly and reliably transmit the fact that the task execution user has accepted the target task to the registered user. In addition, it is possible to quickly transmit the fact that the target task has been performed by the execution user (the share user) to the registered user.

In addition, in the present embodiment, a position when the target task is performed is obtained on the basis of the own position acquired in the position acquisition unit 21. Therefore, in the present embodiment, when the target task is performed at a predetermined position, it is possible to easily set executable conditions. According to the present embodiment, for example, executable conditions when buying vegetables is the target task can include arrival at a vegetable store such as a convenience store or a supermarket. In addition, according to the present embodiment, when the executable notification information is generated as the reminder notification information, it is possible to convey the fact that the execution user is in a state in which he or she can execute the target task to the registered user.

As described above, the reminder notification system of the present embodiment is a reminder notification system (for example, the reminder notification system 1) including a first terminal (for example, the first portable terminal 2) and a second terminal (for example, the second portable terminal 3), which include a reminder notification unit (for example, the notification unit 40) configured to provide a reminder of a task when executable conditions of the predetermined task are satisfied. The first terminal includes a task registration setting unit (for example, the task registration setting unit 26) configured to register and set the predetermined task as the target task. The first terminal and the second terminal each include a task information share unit (for example the task information share unit 27) configured to share the target task that is registered and set in the task registration setting unit between the first terminal and the second terminal. At least one of the first terminal and the second terminal includes a notification terminal setting unit (for example, the notification terminal setting unit 29) configured to set any of the first terminal and the second terminal as the notification terminal configured to provide the reminder on the basis of content of the task. The reminder notification unit included in the notification terminal provides the reminder when executable conditions of the target task are satisfied.

In such a configuration, the reminder notification system 1 of the present embodiment shares the task between the first terminal and the second terminal, and when executable conditions of the target task are satisfied, the notification terminal provides the reminder. Therefore, since task information about the target task can be shared, a process of executing the task can be cooperatively performed between a user who possesses the first terminal and a user who possesses the second terminal. Accordingly, when the task set between the user and another user is performed, it is possible to smoothly perform the process until the reminder is provided.

In addition, in the reminder notification system 1 of the present embodiment, the second terminal includes an acceptance detection unit (the task acceptance detection unit 30) configured to detect acceptance of the target task and an acceptance notification unit (the transmitting and receiving information processing unit 31) configured to notify the first terminal of the acceptance of the target task when the acceptance of the target task is detected by the acceptance detection unit.

In such a configuration, when the registered user and the execution user are different, it is possible to reliably transmit the fact that the task execution user has accepted the task to the registered user.

In addition, in the reminder notification system 1 of the present embodiment, the second terminal includes a completion detection unit (the task completion detection unit 33) configured to detect execution completion of the task and a completion notification unit (the notification unit 40) configured to notify the first terminal of execution completion of the target task when execution completion of the target task is detected by the completion detection unit if the second terminal is the notification terminal.

In such a configuration, when the registered user and the execution user are different, it is possible to quickly transmit completion of the task to the registered user.

In addition, in the reminder notification system 1 of the present embodiment, the second terminal includes a reminder notification information notification unit (the reminder notification information generation unit 35) configured to notify the first terminal of the reminder notification information when the second terminal is notified of the reminder if the second terminal is the notification terminal.

In such a configuration, it is possible to quickly transmit the fact that the task is transmitted to the execution user to a task registrant.

In addition, in the reminder notification system 1 of the present embodiment, the notification terminal further includes a position acquisition unit (the position acquisition unit 21) configured to detect a predetermined position. The executable conditions are determined on the basis of the position acquired in the position acquisition unit.

In such a configuration, when the task is performed at the predetermined position, it is possible to easily set executable conditions.

In addition, in the reminder notification system 1 of the present embodiment, the executable conditions include acquisition of arrival of a performer who performs the task at a position in which the task is executed in the execution position of the task by the position acquisition unit.

In such a configuration, it is possible to convey the fact that the task performer is in a state in which he or she can execute the task to the task registrant.

Second Embodiment

Figures 14, 15:
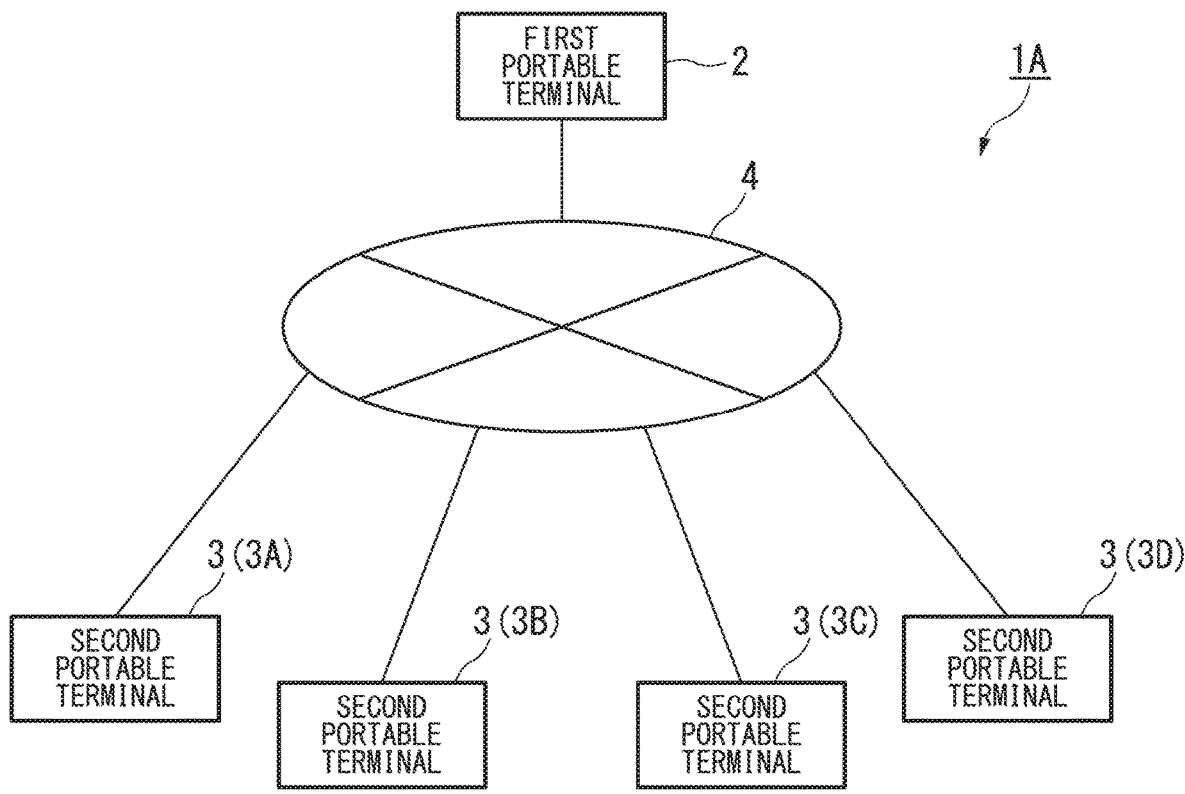
FIG. 14 is a block diagram showing a configuration of a reminder notification system according to a second embodiment.
FIG. 15 is the table showing a relation between automatic transmission and a request display according to a cooperation level.

Next, a second embodiment of the present invention will be described. FIG. 14 is a block diagram showing a configuration of a reminder notification system according to the second embodiment. As shown in FIG. 14, a reminder notification system 1A according to the present embodiment is different from that of the above first embodiment in that a plurality of second portable terminals 3 (3A, 3B . . . ) can communicate with the first portable terminal 2 via the network 4. Therefore, in the reminder notification system 1A according to the present embodiment, the first portable terminal 2 can share the target task with each of the plurality of second portable terminals 3A, 3B . . . . In addition, the reminder notification system according to the present embodiment is different from that of the first embodiment in that it is possible to set information between the first portable terminal 2 and the plurality of second portable terminals 3A, 3B . . . , and particularly, a share level of position information.

FIG. 15 is the table showing a relation between automatic transmission and a request display according to a cooperation level. The cooperation level is a level indicating a degree of cooperation between the first portable terminal 2 and each of the second portable terminals 3A, 3B . . . and is set between the first portable terminal 2 and each of the second portable terminals 3A, 3B . . . . The cooperation level shown in FIG. 15 corresponds to the share level. A higher cooperation level indicates a higher share level. In addition, the cooperation level is set such that a smaller numeric value indicates a higher level. In addition, the share level is a level determined on the basis of an amount and quality of information that is shared among the plurality of portable terminals. A higher share level indicates a larger amount of information that is shared among the plurality of portable terminals. Alternatively, a higher share level indicates higher quality of information that is shared among the plurality of portable terminals.

As shown in FIG. 15, a cooperation level 1 is a level for constantly notifying of position information. Automatic transmission of position information is set to "ON" and therefore automatic transmission of position information is possible. In addition, a position information request display is set to "OFF." A cooperation level 2 is a level for providing position information based on a request. Automatic transmission of position information is set to "OFF" and therefore automatic transmission of position information is not possible. In addition, the position information request display is set to "ON." "ON" indicates that automatic transmission is performed and "OFF" indicates that no automatic transmission is performed. A cooperation level 3 is a level for actively notifying of position information by ignoring a request.

Automatic transmission of position information is set to "OFF" and therefore automatic transmission of position information is not possible. In addition, the position information request display is set to "OFF."

In general, a familiarity between a user and another user is different from a familiarity between the user and a user other than the above another user in many cases. For example, a user and a first other user have a parent-child relationship and the user and a second other user are colleagues in a company. In this case, a familiarity between the user and the first other user is higher than a familiarity between the user and the second other user in many cases. In this manner, when a familiarity among the plurality of users is different, it is preferable that an amount and quality of information to be shared be different according to the familiarity. Therefore, by setting the share level between users, it is possible to share appropriate information according to the familiarity between users.

Such a cooperation level is set between the first portable terminal 2 and each of the plurality of second portable terminals 3A, 3B . . . . For example, the cooperation level between the first portable terminal 2 and the second portable terminal 3A is set to "2," the cooperation level between the first portable terminal 2 and the second portable terminal 3B is set to "3," the cooperation level between the first portable terminal 2 and the second portable terminal 3C is set to "1," and the cooperation level between the first portable terminal 2 and the second portable terminal 3D is set to "3." In this case, the cooperation level between the first portable terminal 2 and the second portable terminal 3C is the highest.

Figure 16:
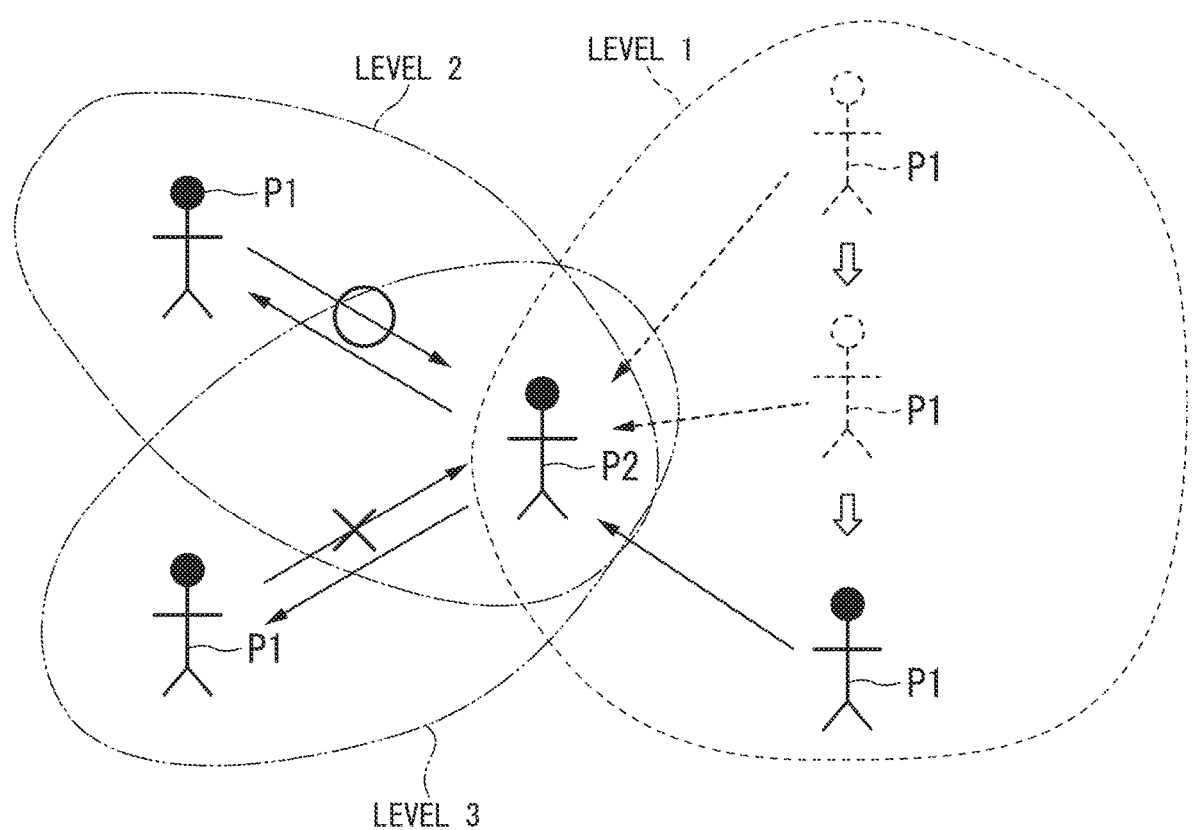
FIG. 16 is a diagram for describing a cooperation level.

Further, description will be provided with reference to FIG. 16. FIG. 16 is a diagram for describing a cooperation level.

As shown in FIG. 16, in the cooperation level 1, a user (hereinafter referred to as a "first user") P1 who possesses the first portable terminal 2 constantly transmits an own position automatically to another user who possesses the second portable terminal 3 (hereinafter referred to as a "second user") P2. Therefore, when the first user P1 moves, a position of the first user is constantly transmitted to the second user.

In addition, in the cooperation level 2, the first portable terminal 2 of the first user P1 does not automatically transmit position information to the second portable terminal 3 of the second user P2. However, in the cooperation level 2, the first user P1 can actively transmit position information to another user who possesses the second portable terminal 3. In addition, in the cooperation level 2, the first portable terminal 2 of the first user P1 displays a position information acquisition request from the second portable terminal 3 of the second user P2 in a dialog box.

In the cooperation level 3, the first portable terminal 2 of the first user P1 does not automatically transmit position information to the second portable terminal 3 of the second user P2. In addition, in the cooperation level 3, the first user P1 can actively transmit position information to another user who possesses the second portable terminal 3. However, in the cooperation level 3, the first portable terminal 2 of the first user P1 does not display a position information acquisition request from the second portable terminal 3 of the second user P2 in the dialog box.

In this manner, by setting the share level (the cooperation level) between the first portable terminal 2 and each of the plurality of second portable terminals 3A, 3B . . . , the share level can be set according to a familiarity between a user who possesses the first portable terminal 2 and another user who possesses each of the second portable terminals 3A, 3B . . . . Accordingly, the share level is set in consideration of a balance between convenience and privacy when position information is provided. For example, since it is possible to limit information to be provided to another user having a low familiarity with the user, it is possible to increase a degree of reliability when information is shared.

In addition, in the above second embodiment, the first portable terminal 2 can share the target task with the plurality of second portable terminals 3A, 3B . . . . Therefore, when one target task is set, since the target task is shared with many portable terminals and the target task is executable in the plurality of portable terminals 3A, 3B . . . , it is possible to perform the target task quickly and reliably.

In the above second embodiment, while information to be shared is position information, the share level can also be set for other information. For example, when a reminder notification is performed, the share level may be set for information about the target task of the reminder notification. For example, only meeting is the target task of the reminder notification between the first portable terminal 2 and the second portable terminal 3A. However, requests for meeting and shopping may be the target task of the reminder notification between the first portable terminal 2 and the second portable terminal 3B.

In addition, the above second embodiment, while the first portable terminal 2 and the second portable terminals 3A, 3B . . . can communicate via the network 4, the second portable terminals 3A, 3B . . . can communicate to each other via the network 4. In this case, when the first portable terminal 2 shares the target task with the plurality of second portable terminals 3A, 3B . . . , a second portable terminal that performs the target task most quickly can provide information that the target task has been performed to the other second portable terminals. In this case, it is possible to prevent a useless task process in the other second portable terminals.

Figure 17:
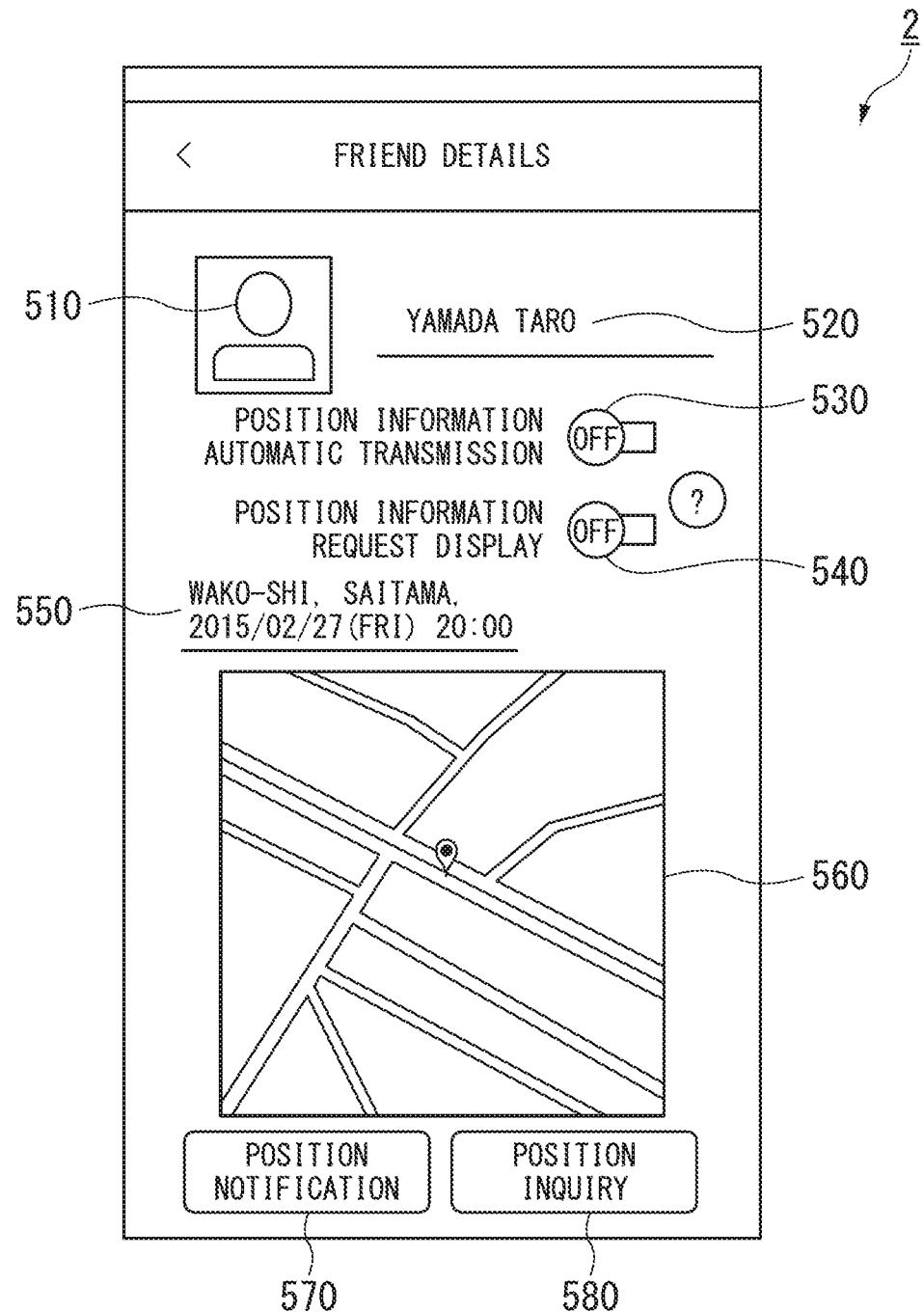
FIG. 17 is a diagram showing an example of a screen display of the first portable terminal.

In addition, instead of a form in which the cooperation level is set in three levels, the share level can be set, for example, for each item of cooperation levels. FIG. 17 is a diagram showing an example of a screen display of the first portable terminal 2. In the screen shown in FIG. 17, information about other users is displayed as friend details. In the screen, a face photo image 510 and name information 520 of a friend are displayed, and a position information automatic transmission button 530 and a position information request display button 540 are displayed therebelow, which can be selected by toggle buttons. In addition, address information 550 and a map image 560 are displayed below the position information automatic transmission button 530 and the position information request display button 540. A position notification icon 570 and a position inquiry icon 580 are displayed below the map image 560.

In the screen display shown in FIG. 17, the share level can be set for each friend shown in the face photo image 510 and the name information 520 of the friend. In addition, by manipulating the position information automatic transmission button 530 and the position information request display button 540, it is possible to set the share level of position information automatic transmission and position information request display for each friend.

In addition, providing an own position to the friend can be executed by manipulating the position notification icon 570, and a request for position information from the friend can be executed by manipulating the position inquiry icon 580. In addition, position information of the friend is displayed in the address information 550 and on the map image 560.

In this manner, by manipulating the position information automatic transmission button 530 and the position information request display button 540, it is possible to set the share level of the position information automatic transmission and the position information request display in two levels of ON and OFF. In this case, since the share level of other users is set for each item, it is possible to easily recognize the share level.

As described above, the reminder notification system 1A of the present embodiment is a reminder notification system (for example, the reminder notification system 1) including a first terminal (for example, the first portable terminal 2) and a second terminal (for example, the second portable terminal 3) which include a reminder notification unit (for example the notification unit 40) configured to provide a reminder of a task when executable conditions of the predetermined task are satisfied. The first terminal includes a task registration setting unit (for example, the task registration setting unit 26) configured to register and set the predetermined task as the target task. The first terminal and the second terminal each include a task information share unit (for example, the task information share unit 27) configured to share the target task that is registered and set in the task registration setting unit between the first terminal and the second terminal. At least one of the first terminal and the second terminal includes a notification terminal setting unit (for example, the notification terminal setting unit 29) configured to set any of the first terminal and the second terminal as the notification terminal configured to provide the reminder on the basis of content of the task. The reminder notification unit included in the notification terminal provides the reminder when executable conditions of the target task are satisfied. In addition, the first terminal and the second terminal each include a share level setting unit configured to set a share level of information between the terminals.

In such a configuration, the share level can be set according to a relation such as a familiarity between the task registrant and the task performer.

In addition, in the reminder notification system 1A of the present embodiment, a plurality of the second terminals are provided. Each of the second terminals includes an individual acceptance detection unit (the task acceptance detection unit 30) configured to detect acceptance of the corresponding target task and an individual acceptance notification unit (the transmitting and receiving information processing unit 31) configured to notify a different second terminal that is not included in the other second terminals of acceptance of the target task when acceptance of the target task is detected by the individual acceptance detection unit.

In addition, in the reminder notification system 1A of the present embodiment, a plurality of the second terminals are provided. Each of the second terminals includes an individual completion detection unit (the task completion detection unit 33) configured to detect execution completion of the task when the notification terminal is the second terminal and an individual completion notification unit (the reminder notification information generation unit 35 and the transmitting and receiving information processing unit 31) configured to notify a different second terminal that is not included in the other second terminals of execution completion of the target task when execution completion of the target task is detected by the individual completion detection unit.

In such a configuration, it is possible to confirm that the task was performed between the task registrant and the task performer. When the task is registered for a plurality of task performers, if one task performer accomplishes execution of the task, it is possible to prevent a useless task process by other task performers.

In addition, a reminder notification may be performed such that a program for implementing functions of the reminder notification system in the present invention is recorded in a non-transitory computer readable recording medium, and a computer system reads and executes the program recorded in the recording medium. The term "computer system" used herein includes an OS or hardware such as peripheral devices. In addition, the "computer system" also includes a WWW system having a homepage providing environment (or a display environment). Moreover, the "computer readable recording media" include portable media such as a flexible disk, a magneto-optical disc, a ROM, and a CD-ROM, and a storage device built in the computer system such as a hard disk.

Further, the "computer readable recording media" include media that maintain a program for a predetermined time like a volatile memory (RAM) in the computer system serving as a server or a client when the program is transmitted through a network such as the Internet or a communication line such as a telephone line.

In addition, the program may be transmitted from the computer system in which the program is stored in, for example, the storage device, to another computer system through transmission media or a transmission wave in the transmission media. Here, the term "transmission media" for transmitting the program refers to media that have a function of transmitting the information like a network (a communication network) such as the Internet or a communication line (a communication wire) such as a telephone line. In addition, the program may also include a program for implementing a part of the above-described functionality and include a differential file (a differential program) in which the above-described functionality is implemented in combination with a program that has already been recorded in the computer system.

While the embodiments of the invention have been described above in detail with reference to the drawings, specific configurations are not limited to the above-described embodiments and various design modifications within the scope without departing from the scope and spirit of the invention can be made.

What is claimed is:

1. A reminder notification system, comprising:
a first terminal and a second terminal, each of the first terminal and the second terminal being a portable computing device including a processor in communication with memory, wherein each of the first terminal and the second terminal comprise:
a reminder notification unit comprising at least one of an image display panel, a speaker, and a vibrator, the reminder notification unit being controlled by the processor, the reminder notification unit configured to provide a reminder of a predetermined task when executable conditions of a target task are satisfied;
a task registration setting unit stored in the memory and executed by the processor, the task registration setting unit configured to register and set the predetermined task as the target task;
a task information share unit stored in the memory and executed by the processor, the task information share unit configured to share the target task that is registered and set by the task registration setting unit between the first terminal and the second terminal;
a share level setting unit stored in the memory and executed by the processor, the share level setting unit configured to set a share level of information that is shared between the first terminal and the second terminal, wherein the share level setting unit is configured to function as a notification terminal setting unit to set, via a graphical user interface of the portable computing device, any of the first terminal and the second terminal as a notification terminal configured to provide the reminder on the basis of content of the target task based on a user selection of an icon displayed along with a request message or based on a user selection of a toggle button, via the graphical user interface of the portable computing device, wherein the graphical user interface comprises a screen for receiving a selection of the share level between the first terminal and the second terminal;
an acceptance detection unit stored in memory and executed by the processor, the acceptance detection unit configured to detect acceptance of the target task and notify the other of the first terminal or the second terminal of the acceptance of the target task when the acceptance of the target task is detected by the acceptance detection unit;
a position acquisition unit stored in memory and executed by the processor, the position acquisition unit configured to acquire, via a Global Positioning System (GPS), a position information of a current location of at least one of the first terminal and the second terminal, wherein the position acquisition unit is configured to detect and transmit, via the Global Positioning System (GPS), the position information of the associated first terminal and second terminal based on the share level of information between the first terminal and the second terminal;
a completion detection unit stored in memory and executed by the processor, the completion detection unit configured to detect execution completion of the target task and notify at least one of the first terminal and the second terminal of execution completion of the target task when execution completion of the target task is detected by the completion detection unit,
wherein the executable conditions are determined on the basis of the position acquired by the position acquisition unit,
wherein the executable conditions include acquisition of arrival of a performer who performs the target task at a position in which the target task is executed at the execution position of the target task, and
wherein the reminder notification system is operable in each of a first state and a second state, the first state being a state in which the notification terminal is one of the first terminal and the second terminal which is used by the performer who performs the target task, and the second state being a state in which the notification terminal is one of the first terminal and the second terminal which is different than the one of the first terminal and the second terminal which is used by the performer who performs the target task.

2. The reminder notification system according to claim 1, wherein the processor of the second terminal is further configured to function as a reminder notification information notification unit that notifies the first terminal of reminder notification information when the second terminal is notified of the reminder when the second terminal is the notification terminal.

3. The reminder notification system according to claim 1, wherein a plurality of the second terminal are provided, each of the plurality of the second terminal being identical, and the acceptance detection unit of each of the plurality of the second terminal is configured to notify other second terminals of acceptance of the target task when acceptance of the target task is detected by the acceptance detection unit.

4. The reminder notification system according to claim 1, wherein a plurality of the second terminal are provided, each of the plurality of the second terminal being identical, and the completion detection unit of each of the plurality of the second terminal is configured to notify other second terminals of execution completion of the target task when execution completion of the target task is detected by the completion detection unit.

5. A reminder notification method in which a reminder notification procedure of providing a reminder of a predetermined task is performed in a first terminal and a second terminal, each of the first terminal and the second terminal being a portable computing device including a processor in communication with a memory, a Global Positioning System (GPS), and a reminder notification unit comprising at least one of an image display panel, a speaker, or a vibrator, the reminder notification unit being controlled by the processor, the reminder notification unit configured to provide the reminder of the predetermined task when executable conditions of a target task are satisfied, the reminder notification method comprising:

a task registration setting procedure of registering and setting the predetermined task as the target task;

a task information share procedure of sharing the target task that is registered and set in the task registration setting procedure between the first terminal and the second terminal;

a share level setting procedure of setting a share level of information that is shared between the first terminal and the second terminal;

a notification terminal setting procedure of setting, via a graphical user interface of the portable computing device, any of the first terminal and the second terminal as a notification terminal configured to provide the reminder on the basis of content of the target task based on a user selection of an icon displayed along with a request message or based on a user selection of a toggle button, via the graphical user interface of the portable computing device, wherein the graphical user interface comprises a screen for receiving a selection of the share level between the first terminal and the second terminal;

an acceptance detection procedure of detecting acceptance of the target task and notifying the other of the first terminal or the second terminal of the acceptance of the target task when the acceptance of the target task is detected;

a position acquisition procedure of acquiring, via the Global Positioning System (GPS), a position information of a current location of at least one of the first terminal and the second terminal, wherein the position acquisition procedure includes detecting and transmitting, via the Global Positioning System (GPS), the position information of the associated first terminal and second terminal based on the share level of information between the first terminal and the second terminal; and a completion detection procedure of detecting execution completion of the target task and notifying at least one of the first terminal and the second terminal of execution completion of the target task when execution completion of the target task is detected, wherein the executable conditions are determined on the basis of the position acquired in the position acquisition procedure, wherein the executable conditions include acquisition of arrival of a performer who performs the target task at a position in which the target task is executed at the execution position of the target task, and wherein the reminder notification method is operable in each of a first state and a second state, the first state being a state in which the notification terminal is one of the first terminal and the second terminal which is used by the performer who performs the target task, and the second state being a state in which the notification terminal is one of the first terminal and the second terminal which is different than the one of the first terminal and the second terminal which is used by the performer who performs the target task.

* * * * *